US008628419B2

(12) United States Patent
Tanaka et al.

(10) Patent No.: US 8,628,419 B2
(45) Date of Patent: Jan. 14, 2014

(54) GAME SYSTEM, GAME APPARATUS, STORAGE MEDIUM STORING GAME PROGRAM AND GAME DATA EXCHANGE METHOD

(71) Applicant: Nintendo Co., Ltd., Kyoto (JP)

(72) Inventors: Shoya Tanaka, Kyoto (JP); Masato Kuwahara, Kyoto (JP); Toru Oe, Kyoto (JP); Teruyuki Yoshioka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/828,051

(22) Filed: Mar. 14, 2013

(65) Prior Publication Data
US 2013/0244788 A1  Sep. 19, 2013

Related U.S. Application Data

(63) Continuation of application No. 12/318,711, filed on Jan. 7, 2009, now Pat. No. 8,469,818, which is a continuation of application No. 10/830,085, filed on Apr. 23, 2004, now Pat. No. 7,491,124.

(30) Foreign Application Priority Data

Jun. 17, 2003 (JP) ................................. 2003-172432
Mar. 29, 2004 (JP) ................................. 2004-096954

(51) Int. Cl.
G07F 17/32 (2006.01)
(52) U.S. Cl.
USPC .................................. 463/40; 463/41; 463/42
(58) Field of Classification Search
USPC .................................................. 463/41–44
See application file for complete search history.

(56) References Cited

U.S. PATENT DOCUMENTS

| 4,546,351 A | 10/1985 | Nambu |
| 5,048,831 A | 9/1991 | Sides |
| 5,364,108 A | 11/1994 | Esnouf |
| 5,428,528 A | 6/1995 | Takenouchi et al. |
| 5,461,608 A | 10/1995 | Yoshiyama |
| 5,594,720 A | 1/1997 | Papadopoulos et al. |
| 5,719,859 A | 2/1998 | Kobayashi et al. |
| 5,738,583 A | 4/1998 | Comas et al. |
| 5,987,376 A | 11/1999 | Olson et al. |
| 6,045,447 A | 4/2000 | Yoshizawa et al. |

(Continued)

FOREIGN PATENT DOCUMENTS

| EP | 1 145 748 | 10/2001 |
| JP | 4-359176 | 12/1992 |

(Continued)

OTHER PUBLICATIONS

V Jumpbooks Game Series for GBA YUU*GI*OU Duel Monsters International World-wide edition, Shueisha Inc., Apr. 23, 2003, first version, lower port of p. 20, 1 page.

(Continued)

Primary Examiner — Omkar Deodhar
(74) Attorney, Agent, or Firm — Nixon & Vanderhye PC

(57) ABSTRACT

A game system including a plurality of mobile game apparatuses, and a mobile game apparatus that can communicate with another game apparatus that exists within a communicable range by use of a radio communications unit. When a communicated state is established, exchanging conditions for exchanging game data are received and transmitted, and in a case the exchange conditions are coincident with each other, the game data are exchanged.

112 Claims, 19 Drawing Sheets

(56) References Cited

U.S. PATENT DOCUMENTS

| | | |
|---|---|---|
| 6,175,854 B1 | 1/2001 | Bretscher |
| 6,183,367 B1 | 2/2001 | Kaji et al. |
| 6,322,451 B1 | 11/2001 | Miura |
| 6,383,075 B1 | 5/2002 | Jeong et al. |
| 6,524,189 B1 | 2/2003 | Rautila |
| 6,699,125 B2 | 3/2004 | Kirmse et al. |
| 6,733,382 B2 | 5/2004 | Oe et al. |
| 6,736,727 B1 | 5/2004 | Doi et al. |
| 6,769,915 B2 | 8/2004 | Murgia et al. |
| 6,785,561 B1 | 8/2004 | Kim |
| 6,804,542 B1 | 10/2004 | Haartsen |
| 6,842,460 B1 | 1/2005 | Olkkonen et al. |
| 6,879,570 B1 | 4/2005 | Choi |
| 6,970,448 B1 | 11/2005 | Sparrell et al. |
| 7,136,663 B2 | 11/2006 | Metais et al. |
| 7,177,911 B2 | 2/2007 | DeCarmo |
| 7,491,124 B2 | 2/2009 | Tanaka et al. |
| 7,729,661 B2 | 6/2010 | Tanaka et al. |
| 7,929,911 B2 | 4/2011 | Tanaka et al. |
| 8,073,923 B2 | 12/2011 | Sasaki et al. |
| 8,296,439 B2 | 10/2012 | Tanaka et al. |
| 2001/0008852 A1 | 7/2001 | Izumi |
| 2001/0012757 A1 | 8/2001 | Boyle |
| 2001/0029166 A1 | 10/2001 | Rune et al. |
| 2001/0039212 A1 | 11/2001 | Sawano et al. |
| 2001/0047452 A1 | 11/2001 | Okada et al. |
| 2001/0053691 A1 | 12/2001 | Harma |
| 2002/0002074 A1 | 1/2002 | White et al. |
| 2002/0061743 A1 | 5/2002 | Hutcheson et al. |
| 2002/0119821 A1 | 8/2002 | Sen et al. |
| 2002/0160838 A1 | 10/2002 | Kim |
| 2003/0003994 A1 | 1/2003 | Washio |
| 2003/0008714 A1 | 1/2003 | Tajiri et al. |
| 2003/0040347 A1 | 2/2003 | Roach et al. |
| 2003/0045356 A1 | 3/2003 | Thomas |
| 2003/0060168 A1 | 3/2003 | Teibel |
| 2003/0079003 A1 | 4/2003 | Burr |
| 2003/0114224 A1 | 6/2003 | Anttila et al. |
| 2003/0124979 A1 | 7/2003 | Tanada et al. |
| 2004/0063498 A1 | 4/2004 | Oakes et al. |
| 2004/0082383 A1 | 4/2004 | Muncaster et al. |
| 2004/0087369 A1 | 5/2004 | Tanaka et al. |
| 2004/0128319 A1 | 7/2004 | Davis et al. |
| 2004/0203354 A1 | 10/2004 | Yue |
| 2005/0073522 A1 | 4/2005 | Aholainen et al. |
| 2005/0080896 A1 | 4/2005 | Wu |
| 2005/0282639 A1 | 12/2005 | Tanaka et al. |
| 2007/0197298 A1 | 8/2007 | Rowe |
| 2008/0171601 A1 | 7/2008 | Kirmse et al. |
| 2009/0093310 A1 | 4/2009 | Tanaka et al. |
| 2011/0070950 A1 | 3/2011 | Tanaka et al. |
| 2011/0281655 A1 | 11/2011 | Nguyen et al. |

FOREIGN PATENT DOCUMENTS

| | | |
|---|---|---|
| JP | 07-056497 | 3/1995 |
| JP | 07-095321 | 4/1995 |
| JP | 10-015245 | 1/1998 |
| JP | 10-056417 | 2/1998 |
| JP | 10-151274 | 6/1998 |
| JP | 2867980 | 12/1998 |
| JP | 11-033230 | 2/1999 |
| JP | 2924828 | 5/1999 |
| JP | 11-207031 | 8/1999 |
| JP | 11-355867 | 12/1999 |
| JP | 2000-126455 | 5/2000 |
| JP | 2000-135380 | 5/2000 |
| JP | 2000-151641 | 5/2000 |
| JP | 2000-181822 | 6/2000 |
| JP | 2001-038042 | 2/2001 |
| JP | 2001-087561 | 4/2001 |
| JP | 2001-167036 | 6/2001 |
| JP | 2001-168873 | 6/2001 |
| JP | 2001-212365 | 8/2001 |
| JP | 2002-052253 | 2/2002 |
| JP | 2002-066143 | 3/2002 |
| JP | 2002-165009 | 6/2002 |
| JP | 2002-175234 | 6/2002 |
| JP | 2002-224449 | 8/2002 |
| JP | 2002-2452690 | 8/2002 |
| JP | 2003-023661 | 1/2003 |
| JP | 2003-024643 | 1/2003 |
| JP | 3421017 | 4/2003 |
| JP | 2004-080400 | 3/2004 |
| JP | 2004-136009 | 5/2004 |
| WO | WO 93/23125 | 11/1993 |

OTHER PUBLICATIONS

Japanese Office Action for Japanese Serial No. 2004-096954.
Office Action issued in corresponding Japanese Patent Application No. 2010-200497 on Oct. 18, 2011.
Claudia V. Goldman et al., "E-Play," Multimedia and Expo, 2002, ICME '02, Proceedings, 2002 IEEE International Conference, vol. 2, pp. 321-324.
Robert N. Smith et al., "An Adaptive Mobile Wireless Handover," Computer Software and Applications Conference, 1997, COMPSAC '97, Proceedings, The Twenty-First Annual International, pp. 486-492, Aug. 11, 1997.
Ricky A. Bangun et al., "A Network Architecture for Multiuser Networked Games on Demand," Information, Communications and Signal Processing, 1997 ICICS, Proceedings of 1997 International Conference, vol. 3, pp. 1815-1819, Sep. 9, 1997.
Ricky A. Bangun et al., "An Analysis of Multi-Player Network Games Traffic," Multimedia Signal Processing, 1999 IEEE 3rd Workshop, pp. 3-8, 1999.
Bluetooth Specification v1.OB, Dec. 1, 1999, pp. 104-107.
Hongjun Zhang et al., "A Variable Slot Length TDMA Protocol for Personal Communication Systems," University of Alberta, Department of Computing Science, Apr. 7, 2002, pp. 1-30. http://www.olsonet.com/pg/PAPERS/tdma.pdf.

FIG. 4

EXCHANGE TABLE

| NUMBER | EXCHANGE STARTING CONDITION | EXCHANGE ENDING CONDITION | PROVIDING CHARACTER | | REQUIRED CHARACTER | |
|---|---|---|---|---|---|---|
| | | | KIND | LEVEL | KIND | LEVEL |
| 1 | OBTAIN SPECIFIC ITEM | — | MARIO | 5 | KOOPA | 5 |
| 2 | DEFEAT DRAGON | — | AT PLAYER'S DISCRETION | ANY LEVEL | AT PLAYER'S DISCRETION | AT PLAYER'S DISCRETION |
| 3 | SAVE VILLAGE CHARACTER | — | LUIGI | 7 OR MORE | KOOPA | AT PLAYER'S DISCRETION |
| 4 | APRIL 10 | APRIL 15 | KOOPA | 10 OR MORE | AT PLAYER'S DISCRETION | MORE THAN LEVEL OF PROVIDING CHARACTER |
| 5 | 15:00 | 16:00 | PEACH | ANY LEVEL | AT PLAYER'S DISCRETION | SAME AS THE LEVEL OF PROVIDING CHARACTER |

FIG. 16

(A) CASE OF SEARCHING AND CONNECTING COMMUNICATION DESTINATION 1

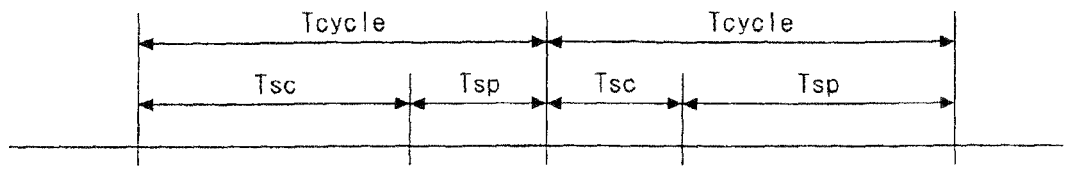

Tcycle IS FIXED VALUE OF 4 SECONDS, FOR EXAMPLE
Tsc IS RANDOM VALUE OF FROM 0 TO Tcycle
Tsp IS Tcycle-Tsc (B) CASE OF SEARCHING AND CONNECTING COMMUNICATION DESTINATION 2

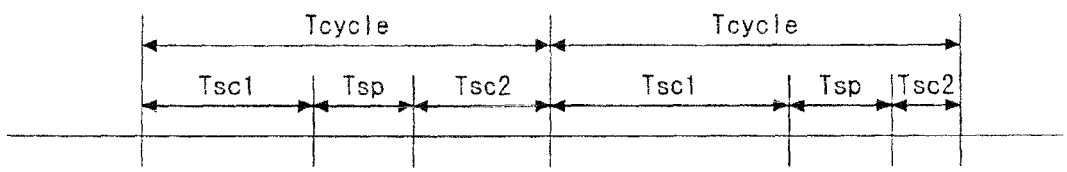

Tcycle IS FIXED VALUE OF 4 SECONDS, FOR EXAMPLE
Tsp IS FIXED VALUE OF 96 msec FOR EXAMPLE
Tsc1 IS RANDOM VALUE OF FROM 0 TO (Tcycle-Tsp)
Tsc2 IS Tcycle-Tsc1-Tsp

FIG. 17

(A) PARENT DEVICE PACKET (BRAODCASTING DATA)

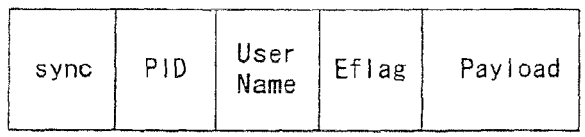

(B) CHILD DEVICE PACKET (CONNECTION REQUESTING DATA)

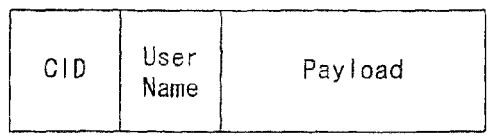

GAME SYSTEM, GAME APPARATUS, STORAGE MEDIUM STORING GAME PROGRAM AND GAME DATA EXCHANGE METHOD

CROSS REFERENCE TO PRIOR APPLICATIONS

This application is a continuation of application Ser. No. 12/318,711 filed Jan. 7, 2009, which is a continuation of application Ser. No. 10/830,085 filed Apr. 23, 2004, now U.S. Pat. No. 7,491,124, which claims priority to Japanese Application No. 2003-172432 filed Jun. 17, 2003 and Japanese Application No. 2004-096954 filed Mar. 29, 2004, the entire contents of each of which are hereby incorporated by reference in this application.

BACKGROUND OF THE INVENTION

1. Field of the Invention

The present invention relates to a game system, a game apparatus, a storage medium storing a game program and a game data exchange method. More specifically, the present invention relates to a game system provided with a plurality of mobile game apparatuses which can radio-communicate with each other, a game apparatus, a storage medium storing a game program, and a game data exchange method.

2. Description of the Prior Art

In a conventional kind of game system, the game apparatus can exchange game data by communicating with another game apparatus. For example, players who desire to exchange game data orally confirm exchange conditions with each other, and then, if the exchange conditions are coincident with each other, the game data is exchanged by connecting the game apparatuses with a fixed-line cable.

An example of such a game system is disclosed in a Japanese Patent Laying-open No. 2003-23661, laid-open on Jan. 24, 2003. In a network game of the prior art, provided that card data and desired card data are set, and if the conditions are coincident with each other, the card data are exchanged.

However, in the former example, there is a need to orally confirm the exchange condition, and therefore, the person with whom the user exchanges the game data is limited to the player's friend, his acquaintance, etc. Thus, if only a few of the player's friends, acquaintances, etc. have the same game software the opportunity to exchange and exchangeable game data are limited; thus, it is almost impossible to fully enjoy the exchange. That is, enjoyment of the game is reduced.

Also, in the latter example, there is a need to connect with a network in order to exchange the game data. This makes it impossible to exchange the game data at any time with ease. However, there is a need to prepare a server for exchange processing, and this increases the burden on the provider of the service, including initial investment, running expenses, etc.

SUMMARY OF THE INVENTION

Therefore, it is a primary feature of the illustrative example to provide a novel game system, game apparatus, storage medium storing a game program, and game data exchange method.

Furthermore, another feature of the illustrative embodiment is to provide a game system, a game apparatus, a storage medium storing a game program, and a game data exchange method that are able to exchange game data with ease and improve an entertainment aspect of the game.

A game system according to the present invention is constructed of a plurality of mobile game apparatuses and exchanges game data between the respective game apparatuses. Each game apparatus, comprises: a game data storer for storing game data; a providing game data designator for designating providing game data that is allowed to be provided to another game apparatus out of the game data stored in the game data storer; an exchange condition setter for setting exchange condition data indicative of an exchange condition that is a condition of game data desired to be provided from said other game apparatus in exchange for a provision of the providing game data to said other game apparatus; a communicator for performing short-distance radio communication with another game apparatus; an exchange desire transmitter for broadcasting by use of the communicator exchange desired data to other game apparatus(es) without specifying a destination address; an exchange desire receiver for receiving by use of the communicator the exchange desired data from another game apparatus; and a game data exchanger for exchanging the game data with a specific game apparatus by use of the communicator, wherein a first game apparatus out of the plurality of game apparatuses transmits the exchange desired data by use of the exchange desire transmitter, and a second game apparatus out of the plurality of game apparatuses receives the exchange desired data, the game data exchanger of the first game apparatus and the game data exchanger of the second game apparatus determine, by communicating at least one of attribute information relating to the providing game data and the exchange condition data by use of the communicator, whether or not the providing game data of the first game apparatus satisfies the exchange condition of the second game apparatus, and whether or not the providing game data of the second game apparatus satisfies the exchange condition of the first game apparatus, and exchange, in a case both of the exchange conditions are satisfied, the providing game data of the first game apparatus for the providing game data of the second game apparatus.

More specifically, the game system is constructed of a plurality of mobile game apparatuses (10: corresponding reference numeral in the detailed description of the preferred embodiments described later. Hereinafter, the same is applied), and exchanges the game data between the respective game apparatuses (10). Each game apparatus (10) is provided with the game data storer (28 or 44) in which the game data is stored. The providing game data designator (20, 38, S45 to S57, S67) designates the providing game data that is the game data allowed to be provided to another game apparatus (10) out of the game data stored in the game data storer (28 or 44). For example, the game data that is allowed to be provided to another game apparatus (10) by the player is designated in response to an instruction from the player, or the game data to be provided to another game apparatus (10) is automatically designated by the game program. The exchange condition setter (20, 38, S59 to S67) sets the exchange condition that is the condition of the game data desired to be provided from said other game apparatus (10) in exchange for the provision of the providing game data to said other game apparatus (10). Herein, the exchange condition is a condition to determine the game data (providing game data and game data to be exchanged) to be provided from said other game apparatus (10) is the kind of the game data. For example, the game data desired to be provided from another game apparatus (10) is designated in response to an instruction from the player, or is automatically designated by the game program. The communicator (14) communicates with another game apparatus (10) by short-distance radio communication. The exchange desire transmitter (20, S167, S197) broadcasts by use of the communicator (14) the exchange desired data (data indicative of being connectable) to other game apparatus(es) (10) without specifying the destination address. The exchange desire receiver (20, S155, S185, S211) receives by use of the communicator (14) the exchange desired data from another game apparatus (10). The game data exchanger (20, S105 to S109, S135 to S139) exchanges the game data with a specific game apparatus (10) by use of the communicator (14).

For example, the first game apparatus out of the plurality of game apparatuses (10) transmits the exchange desired data by use of the exchange desire transmitter (20, S167, S197), and the second game apparatus out of the plurality of game apparatuses receives the exchange desired data. The game data exchanger (20, S105 to S109, S135 to S139) of the first game apparatus and the game data exchanger (20, S105 to S109, S135 to S139) of the second game apparatus communicate at least one of the attribute information (kind and level of the character) relating to the providing game data and the exchange condition data (kind and level of the character desired to be provided) by use of the communicator (14). Each of the game data exchangers (20, S105 to S109, S135 to S139) determines whether or not the providing game data of the first game apparatus satisfies the exchange condition of the second game apparatus, and whether or not the providing game data of the second game apparatus satisfies the exchange condition of the first game apparatus. Then, in a case that both of the exchange conditions are satisfied, the providing game data of the first game apparatus and the providing game data of the second game apparatus are exchanged with each other. More specifically, the providing game data is erased from the player's own game data storer (28 or 44); and by communicating with another game apparatus (10) by use of the communicator (14), the providing game data of said other game apparatus (10) is received and stored in the game data storer (28 or 44). That is, the game data storer (28 or 44) stores game data generated or obtained through the play of the virtual game by the player, or game data set in advance in the game program.

More specifically, in the case that the game data that is designated as the providing game data in the first game apparatus satisfies the exchange condition set in the second game apparatus, and in the case that the game data that is designated as the providing game data in the second game apparatus satisfies the exchange condition set in the first game apparatus, both of the game data are exchanged. As a method of determining whether or not the exchange conditions are satisfied, there are three methods (methods 1 to 3) as follows.

(1) Method 1

(a) The first game apparatus transmits the predetermined information of the providing game data of its own (e.g., kind and level of the character of the providing game data) to the second game apparatus. (This may be individually transmitted by designating the second game apparatus, or may be broadcasted without designating the second game apparatus.)

(b) The second game apparatus receives the predetermined information relating to the providing game data of the first game apparatus so as to compare the same with the exchange condition of its own. If the condition is satisfied, the second game apparatus transmits the predetermined information relating to the providing game data of its own to the first game apparatus.

(c) The first game apparatus receives the predetermined information relating to the providing game data of the second game apparatus so as to compare the same with the exchange condition of its own. If the condition is satisfied, both of the game data are exchanged between the first game apparatus and the second game apparatus.

(2) Method 2

(a) The first game apparatus transmits the exchange condition of its own to the second game apparatus. (This may be individually transmitted by designating the second game apparatus, or may be broadcasted without designating the second game apparatus.)

(b) The second game apparatus receives the exchange condition of the first game apparatus so as to compare the same with the predetermined information relating to the providing game data of its own. If the condition is satisfied, the second game apparatus transmits the exchange condition of its own to the first game apparatus.

(c) The first game apparatus receives the exchange condition of the second game apparatus so as to compare the same with the predetermined information relating to the providing game data of its own. If the condition is satisfied, both of the game data are exchanged between the first game apparatus and the second game apparatus.

(3) Method 3

(a) The first game apparatus transmits the predetermined information and exchange condition relating to the providing game data of its own to the second game apparatus. (This may be individually transmitted by designating the second game apparatus, or may be broadcasted without designating the second game apparatus.)

(b) The second game apparatus receives the predetermined information and exchange condition relating to the providing game data of the first game apparatus so as to respectively compare the same with the predetermined information and exchange condition relating to the providing game data of its own. If the conditions are satisfied, both of the game data are exchanged between the first game apparatus and the second game apparatus.

Another method except for the above-described three methods is applicable, and it is appropriate that by communicating the predetermined information of the providing game data and the exchange condition between the first game apparatus and the second game apparatus, that the providing game data of the first game apparatus satisfies the exchange condition of the second game apparatus is determined by at least the first game apparatus or the second game apparatus, and that the providing game data of the second game apparatus satisfies the exchange condition of the first game apparatus is determined by at least the first game apparatus or the second game apparatus. The same is applied hereunder.

According to the illustrative embodiment, it is possible to exchange game data having coincident exchange conditions with each other by performing short-distance radio communication; therefore, this eliminates the trouble of negotiating with a player's acquaintance(s) for exchanging the game data, and so forth. That is, it is possible to exchange the game data with ease. Furthermore, since the person with whom the player exchanges the game data is not limited to his acquaintance, it is possible to exchange the game data with a number of people, capable of increasing the possibility of exchanging the game data. In addition, the use of the mobile game apparatus and the short-distance radio communication enables the possibility of exchanging the game data to be increased if only the user goes to wherever people gather, capable of further increasing enjoyment of the exchange. Furthermore, a game data exchanging process is performed between the game apparatuses, and this eliminates a need for preparing a server for the exchange process, and reduces a burden such as initial investment, running cost, etc. for a provider of the game.

Another game system according to the present invention is constructed of a plurality of mobile game apparatuses, and it exchanges game data between the respective game apparatuses. Each game apparatus, comprises: a game data storer for storing game data; a providing game data designator for designating providing game data that is allowed to be provided to another game apparatus out of the game data stored in the game data storer; an exchange condition setter for setting exchange condition data indicative of an exchange condition that is a condition of game data desired to be provided from said other game apparatus in exchange for a provision of the providing game data to said other game apparatus; a communicator for performing short-distance radio communication with another game apparatus; a connection establisher for performing by use of the communicator a process to establish a connection by a radio communication with a specific game apparatus; and a game data exchanger for exchanging the game data with the specific game apparatus by use of the communicator, wherein in a first game apparatus and a second game apparatus out of the plurality of game apparatuses, the connection establisher of one game apparatus executes a first connection establishing process by broadcasting connection requiring data for establishing a connected state with other game apparatus which has received the connection requiring data, and the connection establisher of the other game apparatus executes a second connection establishing process by receiving the connection requiring data for establishing the connected state with the one game apparatus which has broadcasted the connection requiring data, and the game data exchanger of the first game apparatus and the game data exchanger of the second game apparatus determine, by communicating at least one of attribute information relating to the providing game data and the exchange condition data by use of the communicator, whether or not the providing game data of the first game apparatus satisfies the exchange condition of the second game apparatus, and whether or not the providing game data of the second game apparatus satisfies the exchange condition of the first game apparatus, and exchange, in a case both of the exchange conditions are satisfied, the providing game data of the first game apparatus for the providing game data of the second game apparatus by communicating between the first game apparatus and the second game apparatus by use of the communicator.

More specifically, the game system is constructed of the plurality of mobile game apparatuses (10) and exchanges the game data between the respective game apparatuses (10). Each game apparatus (10) is provided with the game data storer (28 or 44) in which the game data is stored. The providing game data designator (20, 38, S45 to S57, S67) designates the providing game data that is allowed to be provided to another game apparatus (10) out of the game data stored in the game data storer (28 or 44). The exchange condition setter (20, 38, S59 to S67) sets the exchange condition data indicative of the exchange condition that is a condition of the game data desired to be provided from said other game apparatus in exchange for the provision of the providing game data to said other game apparatus (10). The communicator (14) performs short-distance radio communication with another game apparatus (10). The connection establisher (20, S81) performs by use of the communicator (14) a process to establish a connection by a radio communication with a specific game apparatus (10). The game data exchanger (20, S105 to S109, S135 to S139) exchanges the game data with the specific game apparatus (10) by use of the communicator (14).

For example, with respect to the first game apparatus and the second game apparatus out of the plurality of game apparatuses (10), the connection establisher (20, S81) of one game apparatus executes the first connection establishing process (20, S165 to S177, S195 to S207) by broadcasting the connection requiring data (for example, data indicative of being connectable for establishing the connected state with another game apparatus which has received the connection requiring data), and the connection establisher (20, S81) of the other game apparatus executes the second connection establishing process (20, S153 to S163, S183 to S193, S209 to S217) by receiving the connection requiring data for establishing the connected state with the one game apparatus which has broadcasted the connection requiring data. The game data exchanger (20, S105 to S109, S135 to S139) of the first game apparatus and the game data exchanger (20, S105 to S109, S135 to S139) of the second game apparatus communicate at least one of the attribute information relating to the providing game data and the exchange condition data between the first game apparatus and the second game apparatus by use of the communicator (14). Thus, each of the game data exchangers (20, S105 to S109, S135 to S139) determines whether or not the providing game data of the first game apparatus satisfies the exchange condition of the second game apparatus, and whether or not the providing game data of the second game apparatus satisfies the exchange condition of the first game apparatus, and then, in a case that both of the exchange conditions are satisfied, exchanges the providing game data of the first game apparatus for the providing game data of the second game apparatus by use of the communicator (14) by communicating between the first game apparatus and the second game apparatus.

In the illustrative embodiment also, it is possible to exchange the game data with ease as in the above-described game system.

In one embodiment of the present invention, the game apparatus, further comprises: a game program storer for storing a game program; a game program executer for generating the game data by executing the game program; and a game data storing process for storing the game data generated by the game program executer in the game data storer. More specifically, the game apparatus (10) is provided with the game program storer (42) for storing the game program. The game program executer (20, S21 to S41) generates the game data by executing the game program. Herein, the generation of the game data is, for example, to obtain character data, item data, and so on according to the situation of the game, to change the attribute information of the characters, and so forth. The game data storing process (20, S41) stores the game data generated by the game program executer (20, S21 to S41) in the game data storer (28 or 44). That is, the character data, the item data, and the attribute information are recorded. Accordingly, it is possible to exchange the game data such as the character data and the like with ease, capable of improving the entertainment aspect of the game.

In another embodiment of the present invention, the exchange condition data includes data for designating a kind of the game data desired to be provided. More specifically, the exchange condition data (data stored in an exchange condition data storing area 282) includes the data (the kind of the character) for designating the kind of the game data desired to be provided. Therefore, the game data such as the game character and the like is exchanged for each kind.

In another embodiment of the present invention, the exchange condition data further includes an attribute value of the game data desired to be provided. More specifically, the exchange condition data further includes the attribute value (for example, the level of the character) of the game data desired to be provided, and therefore, it is possible to exchange the game data by designating not only the kind of the game data, but also the attribute value such as the level of the character.

In a further embodiment of the present invention, the exchange desire transmitter continuously broadcasts the exchange desired data. More specifically, the exchange desire transmitter (20, S167, S197) continuously broadcasts the exchange desired data, and therefore, it is possible to continuously search another game apparatus that satisfies the exchange condition. In a case that the player moves with the game apparatus of the present invention, another game apparatus that exists within the communicable range is variable, and therefore, it is possible to increase a possibility of exchanging the game data by continuously searching for another game apparatus.

In another embodiment of the present invention, the providing game data designator designates the providing game data according to an instruction from a player. More specifically, the providing game data designator (20, 38, S45 to S57, S67) designates the game data according to an instruction from the player. That is, it is possible for the player to designate desired game data.

In another embodiment of the present invention, the providing game data designator is validated when a progress of a virtual game executed by the game apparatus satisfies a predetermined condition. More specifically, when the progress of the virtual game executed by the game apparatus (10) satisfies the predetermined condition ("YES" in step S43), the providing game data designator (20, 38, S45 to S57, S67) is validated, and therefore, it is possible to enhance the user's enthusiasm for progress of the game, such as a game clear, level up, and so on.

In a further embodiment of the present invention, the exchange condition setter sets the exchange condition according to an instruction from a player. More specifically, the exchange condition setter (20, 38, S59 to S67) sets the exchange condition according to the instruction from the player; and therefore, it is possible for the player to set desired game data as the game data required to be provided.

In another embodiment of the present invention, the exchange condition setter is validated when a progress of a virtual game executed by the game apparatus satisfies a predetermined condition. More specifically, when the progress of the virtual game executed by the game apparatus (10) satisfies the predetermined condition ("YES" in step S43), the exchange condition setter (20, 38, S59 to S67) is validated. Accordingly, it is possible to enhance player's enthusiasm for progress of the game, such as a game clear, level up, and so on.

In another embodiment of the present invention, the providing game data designator automatically designates, when a progress of a virtual game executed by the game apparatus satisfies a predetermined condition, the providing game data according to the predetermined condition. More specifically, when the progress of the virtual game executed by the game apparatus (10) satisfies the predetermined condition ("YES" in step S43), the providing game data designator (20, 38, S45 to S57, S67) automatically designates the providing game data according to the predetermined condition. That is, the providing game data intended by a developer such as a programmer of the game, and the like is automatically designated, and this eliminates the player's bother. Furthermore, which game data is designated is unknown to the player; thus, it is possible to increase unpredictability and enjoyment of the exchange.

In a further embodiment of the present invention, the exchange condition setter automatically sets, when a progress of a virtual game executed by the game apparatus satisfies a predetermined condition, the exchange condition according to the predetermined condition. More specifically, when the progress of the virtual game executed by the game apparatus (10) satisfies the predetermined condition ("YES" in step S43), the exchange condition setter (20, 38, S59 to S67) automatically sets the exchange condition according to the predetermined condition. That is, the exchange condition intended by a developer such as a programmer of the game, and the like, i.e., the game data required to be provided is automatically designated, and this eliminates the player's bother. Furthermore, which game data is designated is unknown to the player, and thus, it is possible to increase unpredictability and enjoyment of the exchange.

In one embodiment of the present invention, the game data exchanger includes an inquirer for inquiring of a player whether or not to perform an exchange when it is determined that both of the exchange conditions are satisfied. More specifically, the inquirer (18, 20, S128, S129) inquires of the player whether or not to perform the exchange when it is determined that both of the exchange conditions are satisfied. After inquiring of the player whether or not to perform the exchange, the game data is exchanged, and therefore, it is possible to prevent the game data not intended by the user from being erroneously exchanged.

In another embodiment of the present invention, the game apparatus, further comprises: a game program storer for storing a game program; and a game program executer for executing the game program, wherein when the game program is executed by the game program executer, the game apparatus is connected to said other game apparatus by the connection establisher and executes the exchange processing of the game data with said other game apparatus that satisfies both of the exchange conditions by the game data exchanger. More specifically, the game apparatus (10) is further provided with the game program storer (42). The game program executer (20, S21 to S41) executes the game program. Then, when the game program is executed by the game program executer (20, S21 to S41), the game apparatus is connected said other game apparatus (10) by the connection establisher (20, S81), and executes the exchange processing of the game data with said other game apparatus that satisfies both of the exchange conditions by the game data exchanger (20, S105 to S109, S135 to S139). Thus, the game data is exchangeable even during the game, and this keeps the player from being bored such as simply waiting for the exchange of the game data. In addition, this eliminates a missed opportunity to exchange during the game.

In another embodiment of the present invention, when a progress of a virtual game by the game program executer satisfies a predetermined condition, the game apparatus is connected to said other game apparatus by the connection establisher and executes the exchange processing of the game data with said other game apparatus that satisfies both of the exchange conditions by the game data exchanger. More specifically, when a progress of a virtual game by the game program executer (20, S21 to S41) satisfies a predetermined condition, the game apparatus (10) is connected to said other game apparatus (10) by the connection establisher (20, S81) and executes the exchange processing of the game data with said other game apparatus (10) that satisfies both of the exchange conditions by the game data exchanger (20, S105 to S109, S135 to S139). Thus, it is possible to exchange the game data under the exchange condition according to the progress of the virtual game that constantly changes.

In a further embodiment of the present invention, the exchange desire transmitter broadcasts at least one of the attribute relating to the providing game data of its own and the exchange condition data. More specifically, the exchange desire transmitter (20, S167, S197) broadcasts at least one of the attribute information relating to the providing game data of its own and the exchange condition data. The attribute information relating to the providing game data and the exchange condition data are broadcasted to allow the information to be applied to a number of game apparatuses, capable of promptly performing a process to determine whether or not the exchange condition is satisfied.

In another embodiment of the present invention, the providing game data designator is able to designate a plurality of providing game data, the exchange condition setter sets the exchange condition data in such a manner as to correspond to each of the providing game data, the game data exchanger of the first game apparatus and the game data exchanger of the second game apparatus exchange, when with respect to combinations of respective ones of the providing game data of the first game apparatus and respective ones of the providing game data of the second game apparatus, it is determined that first providing game data that is one of the providing game data of the first game apparatus satisfies the exchange condition brought into correspondence with second providing game data that is one of the providing game data of the second game apparatus, and it is determined that the second providing game data satisfies the exchange condition brought into correspondence with the first providing game data, the first providing game data being satisfying the exchange condition for the second providing game data. More specifically, the providing game data designator (20, 38) is able to designate the plurality of providing game data, the exchange condition setter (20, 38) sets the exchange condition data in such a manner as to correspond to each of the providing game data, and the game data exchanger of the first game apparatus (20) and the game data exchanger of the second game apparatus (20) compare for each combinations or sets of the respective ones of the providing game data of the first game apparatus and the respective ones of the providing game data of the second game apparatus. Then, when it is determined the first providing game data that is one of the providing game data of the first game apparatus satisfies the exchange condition brought into correspondence with the second providing game data that is one of the providing game data of the second game apparatus, and it is determined that the second providing game data satisfies the exchange condition brought into correspondence with the first providing game data, the first providing game data and the second providing game data are exchanged with each other. That is, a number of providing game data can be designated, capable of increasing a possibility of satisfying the exchange condition. Furthermore, the exchange condition is settable for each providing game data, capable of realizing the exchange desired by the player.

In another aspect of the illustrative embodiment, the game system, further comprising: a selector for selecting at least one of the game data stored in the game data storer; a game program storer for storing a game program; and a game program executer for executing the game program by causing the game data selected by the selector to appear in a virtual game world, wherein the game data exchanger does not perform the determination whether or not the exchange condition is satisfied and the exchange of the providing game data with respect to the game data selected by the selector out of the providing game data designated by the providing game data designator. More specifically, the selector (20) selects at least one of the game data stored in the game data storer (28 or 44). The game program storer (42) stores the game program, and the game program executer (20) executes the game program by causing the game data selected by the selector (20) to appear in the virtual game world. Then, the game data exchanger (20) does not perform a determination whether or not the exchange condition is satisfied and the exchange of the providing game data with respect to the game data selected by the selector (20) out of the providing game data designated by the providing game data designator (20, 38). It is noted that it is appropriate that only the determination whether or not the exchange condition is satisfied is not performed. This is because no determination is performed that causes no exchange of the game data. Thus, the exchange is not performed with respect to the game data used (appearing) in the virtual game, causing no inconvenience.

In a further embodiment of the present invention, a game system, further comprising an identifying information exchanger for exchanging identifying information of a game apparatus with the specific game apparatus; and a presenter for presenting to the player the identifying information of the specific game apparatus that satisfies both of the exchange conditions when the inquirer inquires of the player whether or not to exchange. More specifically, the identifying information exchanger (14, 20) exchanges the identifying information (UserName) of the game apparatus (10) with the specific game apparatus (10). The presenter (18, 20, S128) presents to the player the identifying information of the specific game apparatus that satisfies both of the exchange conditions when the inquirer (18, 20, S128, S129) inquires of the player whether or not to exchange. It is possible to determine whether or not to perform the exchange while confirming a person with whom the exchange is performed, which is convenient. Specifically, the illustrative embodiment communicates with a number of game apparatuses by use of short-distance radio communication, and there are cases where the communication destination cannot be specified. Thus, it is meaningful to know the information of the person to whom the game data of player's own is applied.

In another embodiment of the present invention, the game apparatus, further comprises: a display; and an electric power control for controlling a power supply to the display, wherein the exchange desire transmitter, the exchange desire receiver, and the game data exchanger execute their processes while the power supply to the display is suspended by the electric power control, the electric power control performs the power supply to the display at a timing relating to a process of the game data exchanger, and the display displays information relating to the exchange. More specifically, the game apparatus (10) is provided with the display (18). The electric power control (20, 22) controls the power supply to the display (18). The exchange desire transmitter (20, S167, S197), the exchange desire receiver (20, S155, S185, S211) and the game data exchanger (20, S105 to S109, S135 to S139) executes their processes while the power supply to the display (18) is suspended by the electric power control (20, 22). Furthermore, the electric power control (20, 22) starts (restart) the power supply to the display (18) at a given timing (e.g., timing when another game apparatus that satisfies the exchange condition is found, timing to inquire of the user whether or not to perform the exchange, or timing when the exchange is completed) relating to a process of the game data exchanger (20, S105 to S109, S135 to S139). Thereupon, the display (18) displays the information relating to the exchange (information of the character satisfying the exchange condition possessed by other person, the information of the character lost through the exchange, user name of a person with whom the exchange is performed, and so on). Thus, it is possible to search a person who satisfies the exchange condition while reducing power consumption.

In another embodiment of the present invention, the game apparatus, further comprises: an attachment that allows a game program, game identifying information that is identifying information of the game program, and the game data are stored to be detached; a reader for reading, when the medium is attached to the attachment, the game program, the game identifying information, and the game data from the medium; and a game identifying information exchanger for exchanging the game identifying information read by the reader with the specific game apparatus, wherein the game data exchanger exchanges the providing game data with the game data exchanger of the specific game apparatus when a coincidence of the game identifying information is indicated. More specifically, the game apparatus (10) is the attachment (40) being detachably attached with the medium (16) in which the game program, the game identifying information (GameName) that is identifying information of the game program, and the game data are stored. The reader (20, 22) reads the game program, the game identifying information, and the game data from the medium (16) when the medium (16) is attached to the attachment means (40). The game identifying information exchanger (14, 20, 22) exchanges the game identifying information read by the reader (20, 22) with the specific game apparatus (10). The game data exchanger (20, S105 to S109, S135 to S139) exchanges the providing game data with the game data exchanger (20, S105 to S109, S135 to S139) of the specific game apparatus (10) when the coincidence of the game identifying information is indicated ("YES" in S155, S185, S211). That is, it is possible to determine the exchange condition with only the person who executes the same game, reducing waste.

A game apparatus according to the present invention, comprising: a game data storer for storing game data; a providing game data designator for designating providing game data being game data that is allowed to be provided to another game apparatus out of the game data stored in the game data storer; an exchange condition setter for setting exchange condition data indicative of an exchange condition that is a condition of game data desired to be provided from said other game apparatus in exchange for a provision of the providing game data to said other game apparatus; a communicator for performing short-distance radio communication with another game apparatus; an exchange desire transmitter for broadcasting by use of the communicator exchange desired data to other game apparatus(es) without specifying a destination address; an exchange desire receiver for receiving by use of the communicator the exchange desired data from another game apparatus; and a game data exchanger for exchanging the game data with a specific game apparatus by use of the communicator. The game data exchanger determines, by communicating with the specific game apparatus at least one of attribute information relating to the providing game data and the exchange condition data by use of the communicator, in association with the game data exchanger of the specific game apparatus whether or not the providing game data of its own satisfies the exchange condition of the specific game apparatus, and whether or not the providing game data of the specific game apparatus satisfies the exchange condition of its own, and exchanges in a case that it is determined both of the exchange conditions are satisfied, the providing game data of its own for the providing game data of the specific game apparatus by communicating with the specific game apparatus by use of the communicator.

More specifically, the game apparatus (10) is provided with the game data storer (28 or 44) in which the game data is stored. The providing game data designator (20, 38, S45 to S57, S67) designates the providing game data that is game data allowed to be provided to another game apparatus (10) out of the game data stored in the game data storer (28 or 44). The exchange condition setter (20, 38, S59 to S67) sets the exchange condition data indicative of the exchange condition that is a condition of the game data desired to be provided from said other game apparatus in exchange for the provision of the providing game data to said other game apparatus (10). The communicator (14) performs short-distance radio communication with another game apparatus (10). The exchange desire transmitter (20, S167, S197) broadcasts by use of the communicator (14) the exchange desired data to other game apparatus(es) (10) without specifying the destination address. The exchange desire receiver (20, S155, S185, S211) receives by use of the communicator (14) the exchange desired data from another game apparatus (10). The game data exchanger (20, S105 to S109, S135 to S139) exchanges the game data with a specific game apparatus (10) by use of the communicator (14). For example, the game data exchanger (20, S105 to S109, S135 to S139) communicates with the specific game apparatus at least one of attribute information relating to the providing game data and the exchange condition data by use of the communicator (14). Thus, game data exchanger (20, S105 to S109, S135 to S139) determines in association with the game data exchanger (20, S105 to S109, S135 to S139) of the specific game apparatus (10) whether or not the providing game data of its own satisfies the exchange condition of the specific game apparatus (10), and whether or not the providing game data of the specific game apparatus (10) satisfies the exchange condition of its own, and exchanges in a case that it is determined both of the exchange conditions are satisfied, the providing game data of its own for the providing game data of the specific game apparatus (10) by communicating with the specific game apparatus (10) by use of the communicator (14).

According to the illustrative embodiment, the above-described game system can be constructed of the plurality of game apparatuses of the same kind. That is, for a maker of the game apparatus, one kind of the game apparatus suffices to be placed on the market. For the player also, merely purchasing one game apparatus enables communications with any apparatus, and therefore, it is convenient for the player.

In one aspect of the present invention, a switch for alternately executing a process of the exchange desire transmitter and a process of the exchange desire receiver is further provided. More specifically, the switch (20, S153, S165, S183, S195, S209) alternately switches the process of the exchange desire transmitter (20, S167, S197) and the process of the exchange desire receiver (20, S155, S185, S211). Therefore, it is possible to surely communicate with another game apparatus, and exchange the game data.

In another aspect of the present invention, the switch alternately repeats a first period for broadcasting the exchange desired data by the process of the exchange desire transmitter and a second period for attempting to receive the exchange desired data by the process of the exchange desire receiver, further comprising a period's length setter for variably setting a length of at least one of the first period and the second period. More specifically, the switch (20, S153, S165, S183, S195, S209) alternately repeats the first period and the second period. In the first period, the exchange desired data is broadcasted by the process of the exchange desire transmitter (20, S167, S197). In the second period, the exchange desired data is attempted to be received by the process of the exchange desire receiver (20, S155, S185). The period's length setter (20, S151, S181) variably (at random) sets the length of at least one of the first period and the second period.

Herein, the game apparatus executing the process of the first period and the game apparatus executing the process of the second period can establish a connection with each other, and the game apparatus executing the process of the first period and the game apparatus executing the process of the first period, or the game apparatus executing the process of the second period and the game apparatus executing the process of the second period cannot establish a connection with each other. Thus, if the first period and the second period are fixed, it becomes impossible to establish a connection between the game apparatuses having the coincident periods all the while. Thus, in the invention, at least one of the first period and the second period are variably set and repeated; therefore, a repetition of the first period and the second period is never constantly coincident among a plurality of game apparatuses. Accordingly, it is possible to surely communicate with another game apparatus, and exchange the game data.

In another aspect of the illustrative embodiment, the switch alternately repeats a first period for broadcasting the exchange desired data by the process of the exchange desire transmitter and a second period for attempting to receive the exchange desired data by the process of the exchange desire receiver, further comprising a period's starting point setter for variably setting a starting point of at least one of the first period and the second period. More specifically, the starting point of at least one of the first period and the second period described above is variably (at random) set. In this case also, it is possible to surely communicate with another game apparatus, and exchange the game data.

Another game apparatus according to the illustrative embodiment, comprises: a game data storer for storing game data; a providing game data designator for designating providing game data that is allowed to be provided to another game apparatus out of the game data stored in the game data storer; an exchange condition setter for setting exchange condition data indicative of an exchange condition that is a condition of game data desired to be provided from said other game apparatus in exchange for a provision of the providing game data to said other game apparatus; a communicator for performing short-distance radio communication with another game apparatus; a connection establisher for performing by use of the communicator a process to establish a connection with a specific game apparatus by a radio communication; and a game data exchanger for exchanging the providing game data for game data of the specific game apparatus that satisfies the exchange condition by use of the communicator. The connection establisher executes a first connection establishing process by broadcasting connection requiring data for establishing a connected state with another game apparatus which has received the connection requiring data, or executes a second connection establishing process by receiving the connection requiring data that is transmitted from another game apparatus for establishing the connected state with said other game apparatus which has broadcasted the connection requiring data, and the game data exchanger determines, by communicating with said other game apparatus at least one attribute relating to the providing game data and the exchange condition data by use of the communicator, in association with the game data exchanger of said other game apparatus, whether or not the providing game data of its own satisfies the exchange condition of said other game apparatus, and whether or not the providing game data of said other game apparatus satisfies the exchange condition of its own, and exchanges, in a case that it is determined both of the exchange conditions are satisfied, the providing game data of its own for the providing game data of said other game apparatus by communicating with said other game apparatus by use of the communicator.

In another game also, the above-described game system is constructed of the plurality of game apparatuses having the same kind as in the game apparatus described above. That is, there is no need to place the game apparatus having the first connection establishing processing function and the game apparatus having the second connection establishing processing function on the market; one kind of the game apparatus suffices to be placed on the market. For the player also, merely purchasing one game apparatus enables communications with any apparatus, being convenient for the player.

In one aspect of the illustrative embodiment, the game apparatus further comprises a switch that executes the first connection establishing process and executes the second connection establishing process for alternately executing the first connection establishing process and the second connection establishing process. Accordingly, it is possible to reliably communicate with another game apparatus, and exchange the game data as in the above-described game apparatus.

In another aspect of the illustrative embodiment, the switch alternately repeats a first period for broadcasting the connection requiring data by the first connection establishing process and a second period for attempting to receive the connection requiring data by the second connection establishing process, and further comprising a period's length setter for variably setting a length of at least one of the first period and the second period. Accordingly, it is possible to reliably communicate with another game apparatus, and exchange the game data as in the above-described game apparatus.

In the other aspect of the present invention, the switch alternately repeats a first period for broadcasting the connection requiring data by the first connection establishing process and a second period for attempting to receive the connection requiring data by the second connection establishing process, and further comprising a period's starting point setter for variably setting a starting point of at least one of the first period and the second period. Accordingly, it is possible to reliably communicate with another game apparatus, and exchange the game data as in the above-described game apparatus.

A storage medium storing a game program according to the illustrative embodiment, and the game program is executed by each game apparatus in a game system that is provided with a plurality of mobile game apparatuses. Each game apparatus, comprises: a processor; a game data storer for storing game data; and a communicator for performing short-distance radio communication with said other game apparatus. The game program makes the processor of the game apparatus execute: a providing game data designating step for designating providing game data that is allowed to be provided to another game apparatus out of the game data stored in the game data storer; an exchange condition setting step for setting exchange condition data indicative of an exchange condition that is a condition of game data desired to be provided from said other game apparatus in exchange for a provision of the providing game data to said other game apparatus; an exchange desire transmitting step for broadcasting by use of the communicator exchange desired data to other game apparatus(es) without specifying a destination address; an exchange desire receiving step for receiving by use of the communicator the exchange desired data that is transmitted from another game apparatus; and a game data exchange step for determining, by communicating with the specific game apparatus at least one attribute relating to the providing game data and the exchange condition data by use of the communicator, in association with said other game apparatus whether or not the providing game data of its own satisfies the exchange condition of the specific game apparatus, and whether or not the providing game data of the specific game apparatus satisfies the exchange condition of its own, and exchanges, in a case that it is determined both of the exchange conditions are satisfied, the providing game data of its own for the providing game data of the specific game apparatus by communicating with the specific game apparatus by use of the communicator.

Also in the storage medium storing the game program, it is possible to exchange the game data with ease as in the above-described game system.

In a storage medium storing a game program according to the present invention, the game program is executed by respective game apparatuses in a game system that is provided with the plurality of mobile game apparatuses. Each game apparatus, comprises: a processor; a game data storer for storing game data; and a communicator for performing short-distance radio communication with another game apparatus. The game program makes the processor of the game apparatus execute: a providing game data designating step for designating providing game data that is allowed to be provided to another game apparatus out of the game data stored in the game data storer; an exchange condition setting step for setting exchange condition data indicative of an exchange condition that is a condition of game data desired to be provided from said other game apparatus in exchange for a provision of the providing game data to said other game apparatus; a connection establishing step for executing a first connection establishing process by broadcasting connection requiring data for establishing a connected state with another game apparatus which has received the connection requiring data, or executes a second connection establishing process by receiving the connection requiring data that is transmitted from another game apparatus for establishing the connected state with said other game apparatus which has broadcasted the connection requiring data; and a game data exchange step for determining, by communicating with said other game apparatus at least one of attribute information relating to the providing game data and the exchange condition data by use of the communicator, in association with said other game apparatus whether or not the providing game data of its own satisfies the exchange condition of said other game apparatus, and whether or not the providing game data of said other game apparatus satisfies the exchange condition of its own, and exchanges, in a case that it is determined both of the exchange conditions are satisfied, the providing game data of its own for the providing game data of said other game apparatus by communicating with said other game apparatus by use of the communicator.

Also in the invention of the storage medium storing the game program, it is possible to exchange the game data with ease as in the above-described another game system.

A game data exchange method according to the present invention is constructed of a plurality of mobile game apparatuses, and is a game data exchange method of a game system for exchanging the game data between the respective game apparatuses. Each game apparatus, comprises: a game data storer for storing game data; a providing game data designator for designating providing game data that is allowed to be provided to another game apparatus out of the game data stored in the game data storer; an exchange condition setter for setting exchange condition data indicative of an exchange condition that is a condition of game data desired to be provided from said other game apparatus in exchange for a provision of the providing game data to said other game apparatus; a communicator for performing short-distance radio communication with another game apparatus; an exchange desire transmitter for broadcasting by use of the communicator exchange desired data to other game apparatus (es) without specifying a destination address; an exchange desire receiver for receiving by use of the communicator the exchange desired data from another game apparatus; and a game data exchanger for exchanging the game data with a specific game apparatus by use of the communicator, wherein (a) a first game apparatus out of the plurality of game apparatuses transmits the exchange desired data by use of the exchange desire transmitter, and a second apparatus out of the plurality of game apparatuses receives the exchange desired data, and (b) the game data exchanger of the first game apparatus and the game data exchanger of the second game apparatus determine, by communicating at least one attribute relating to the providing game data and the exchange condition data by use of the communicator, whether or not the providing game data of the first game apparatus satisfies the exchange condition of the second game apparatus, and whether or not the providing game data of the second game apparatus satisfies the exchange condition of the first game apparatus, and exchange, in a case both of the exchange conditions are satisfied, the providing game data of the first game apparatus for the providing game data of the second game apparatus.

Also in the invention of the game data exchange method, it is possible to exchange the game data with ease as in the above-described game system.

Another game data exchange method according to the illustrative embodiment is constructed of a plurality of mobile game apparatuses, and is a game method of the game system for exchanging the game data between the respective game apparatuses. Each game apparatus, comprises: a game data storer for storing game data; a providing game data designator for designating providing game data that is allowed to be provided to another game apparatus out of the game data stored in the game data storer; an exchange condition setter for setting exchange condition data indicative of an exchange condition that is a condition of game data desired to be provided from said other game apparatus in exchange for a provision of the providing game data to said other game apparatus; a communicator for performing short-distance radio communication with another game apparatus; a connection establisher for performing by use of the communicator a process to establish a connection with a specific game apparatus by radio communication; and a game data exchanger for exchanging the game data with the specific game apparatus by use of the communicator, wherein (a) in a first game apparatus and a second game apparatus out of the plurality of game apparatuses, the connection establisher of one game apparatus executes a first connection establishing process by broadcasting connection requiring data for establishing a connected state with other game apparatus which has received the connection requiring data, and the connection establisher of the other game apparatus executes a second connection establishing process by receiving the connection requiring data for establishing the connected state with the one game apparatus which has broadcasted the connection requiring data, and (b) the game data exchanger of the first game apparatus and the game data exchanger of the second game apparatus determine, by communicating at least one of attribute information relating to the providing game data and the exchange condition data by use of the communicator, whether or not the providing game data of the first game apparatus satisfies the exchange condition of the second game apparatus, and whether or not the providing game data of the second game apparatus satisfies the exchange condition of the first game apparatus, and exchange, in a case both of the exchange conditions are satisfied, the providing game data of the first game apparatus for the providing game data of the second game apparatus by communicating between the first game apparatus and the second game apparatus by use of the communicator.

Also in the illustrative embodiment of the game data exchange method, it is possible to exchange the game data with ease as in the above-described game system.

The above described objects and other objects, features, aspects and advantages of the present invention will become more apparent from the following detailed description of the illustrative embodiment when taken in conjunction with the accompanying drawings.

BRIEF DESCRIPTION OF THE DRAWINGS

FIG. 4 is an illustrative view showing one example of a content of an exchange table stored in an exchange table data storing area in a WRAM shown in FIG. 3;

FIG. 16 is an illustrative view showing a method for setting a period during which the mobile game apparatus attempts to connect as a parent device and a period during which the mobile game apparatus attempts to connect as a parent device in a case that the mobile game apparatus shown in FIG. 1 searches and connects the communication destination;

FIG. 17 is an illustrative view showing a parent device packet for broadcasting from the parent device to the child device and a child device packet for transmitting from the child device to the parent device;

DETAILED DESCRIPTION OF THE PREFERRED EMBODIMENT

Figure 1:
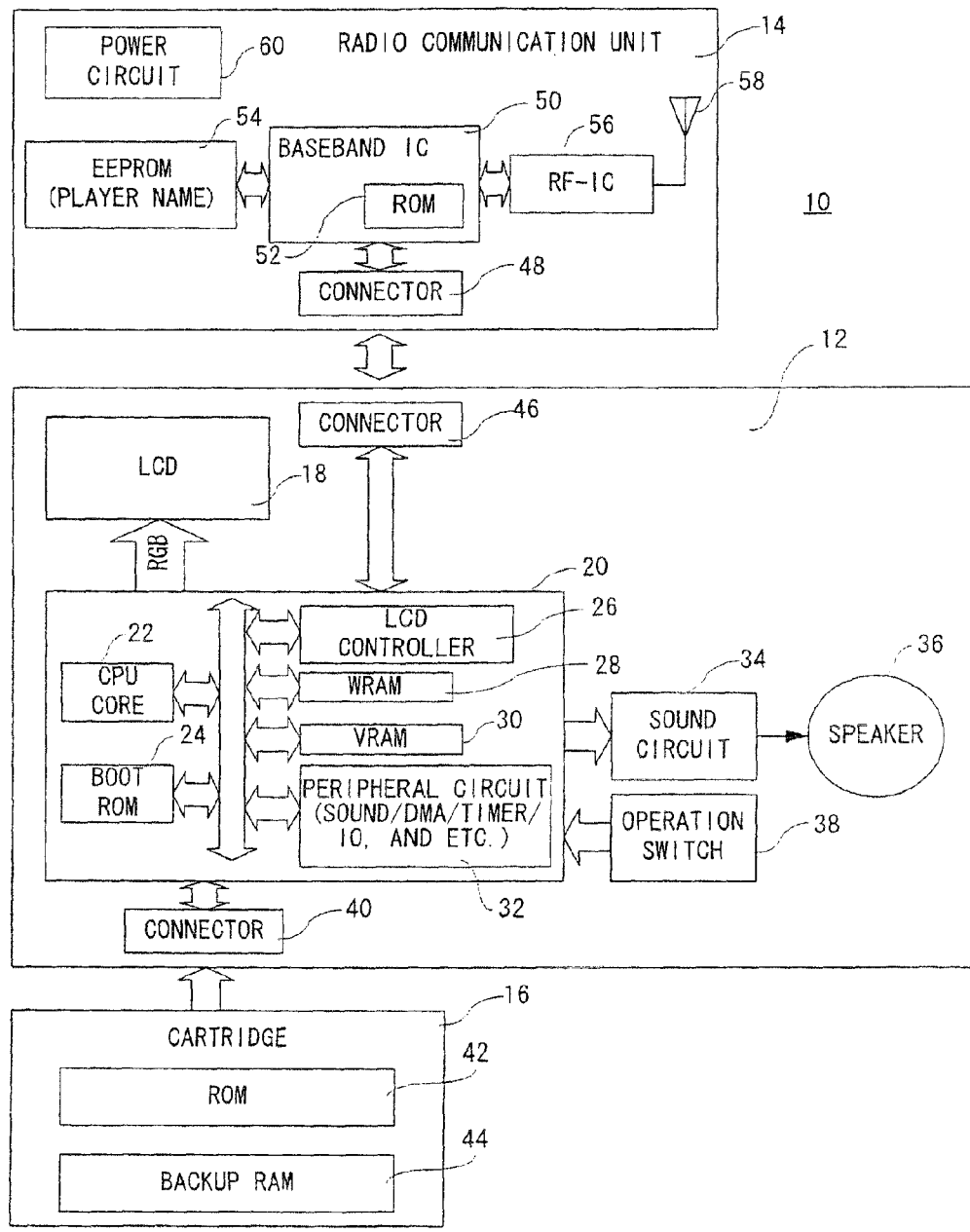
FIG. 1 is a block diagram showing one example of a mobile game apparatus utilized in a game system of an illustrative embodiment.

A radio communication game system to which the present invention is adapted uses a mobile game apparatus 10 as shown in FIG. 1 as an example. In this embodiment, the mobile game apparatus 10 includes a mobile game machine 12 such as a GameBoy Advance (Trademark), for example, a radio communication unit 14 connected to a communication connector 46 of the mobile game machine 12, and a cartridge 16 connected to a cartridge connector 40. That is, in this embodiment, the mobile game apparatus 10 is constructed of the mobile game machine 12, the radio communication unit 14, and the cartridge 16.

The mobile game machine 12 shown in FIG. 1 includes a processor 20, and the processor 20 includes a CPU core 22 and a boot ROM 24 related thereto, an LCD controller 26, a WRAM (working RAM: the same below) 28, a VRAM 30, and a peripheral circuit 32. The peripheral circuit 32 includes a voice (sound) circuit, a DMA (Direct Memory Access) circuit, a timer circuit, an input/output interface (I/O), etc.

In an LCD 18 provided in a front surface of the mobile game machine 12, a displaying signal or an RGB signal in this embodiment is applied from the processor 20, and therefore, a game image is displayed in color on the LCD 18. In addition, an audio signal is applied from the processor 20 to the sound circuit 34, and voices or sound such as a game music and a sound effect is output by the audio signal. Furthermore, a cross key and a start key, a select key, an A button and a B button provided sandwiching the LCD 18 in the front surface of the mobile game machine 12 are congregated and shown as an operation switch 38, and an operation signal from the operation switch 38 is input into the processor 20. Therefore, the processor 20 executes a process in accordance with an instruction of a player applied through the operation switch 38.

Although not illustrated, an electric power is supplied to the LCD 18 from a battery (primary battery or secondary battery), and by setting a predetermined register (LCD power supply register) to 0, the power supply to the LCD 18 is suspended. Further, when the value of the register is set to 1, the power supply to the LCD 18 is started (restarted). The LCD power supply register is provided within the WRAM 28, and the value thereof is rewritten by the CPU core 22. That is, the CPU core 22 controls the start (on) and suspend (off) of the power supply.

The mobile game machine 12 has the cartridge connector 40, and the cartridge 16 is connected or inserted into this cartridge connector 40. The cartridge 16 contains a ROM 42 and a backup RAM 44, and a game program for a game (virtual game) to be executed in the mobile game machine 12, a game image (including a character image), etc. are set (stored) in the ROM 42 in advance. The ROM 42 also stores identifying information ("Game Name" to be described later) for identifying the game program to be stored in the ROM 42. The backup RAM 44 stores (saves) progressive data of the game and resultant data of the game.

The CPU core 22, when a power source of the mobile game machine 12 is turned on, executes a boot program stored in the boot ROM 24, and performs a start-up process of the mobile game machine 12. Thereafter, the CPU core 22 executes a game program stored in the ROM 42 of the cartridge 16, and executes a game processing while storing in the WRAM 28 temporary data being executed. Furthermore, image data generated through the execution of the game program by the CPU core 22 is stored in the VRAM 30, and the image data stored in the VRAM 30 is output to the LCD 18 by the LCD controller 26.

The mobile game machine 12 is further provided with the communication connector 46 to which a connector 48 of the radio communication unit 14 is connected. It is noted that the mobile game machine 12 used in this embodiment is Game-Boy Advance (Trademark) as an example. In this case, the above-described cartridge connector 40 is a 32-pin connector provided at a far side on an upper surface when the LCD 18 is rendered a front surface (front face), and the communication connector 46 is a 6-pin connector provided at a near side on an upper surface.

The radio communication unit 14 includes a baseband IC 50, and the baseband IC 50 includes a ROM 52. The ROM 52 contains an OCD (One-Cartridge Download) program, and other programs, for example, and the baseband IC 50 is operated according to these programs.

It is noted that the One-Cartridge Download program is a program for downloading a program into the child device in an OC mode (one-cartridge mode: a mode in which a game cartridge is attached to the parent device only, and the child device is operated in response to a download of a child device-use program from the parent device cartridge).

The radio communication unit 14 is further provided with an EEPROM 54; and a user's name, for example, is uniquely set to the EEPROM 54. The baseband IC 50 transmits game data transmitted via the connectors 46 and 48 from the game machine 12 and data including the player's name of the EEPROM 54 to an RF (Radio Frequency)-IC56, and the RF-IC 56 modulates the data, and transmits a radio wave from an antenna 58. However, the intensity of the radio wave is extremely weak, and is set to so small a value that the user can use it without a license under Radio Law. In addition, this radio communication unit 14 is provided with a power circuit 60. Typically, the power circuit 60 is a battery, and supplies a DC (direct-current) power source to each component of the radio communication unit 14.

In addition, in the radio communication unit 14, the radio wave transmitted from another mobile game apparatus is received by the antenna 58, demodulated by the RF-IC 56, and a demodulated signal is input into the baseband IC 50. Therefore, the baseband IC 50 decodes the demodulated signal, decodes the data, and transmits the data to the mobile game machine 12, i.e., the WRAM 28 via the connectors 48 and 46.

Figure 2:
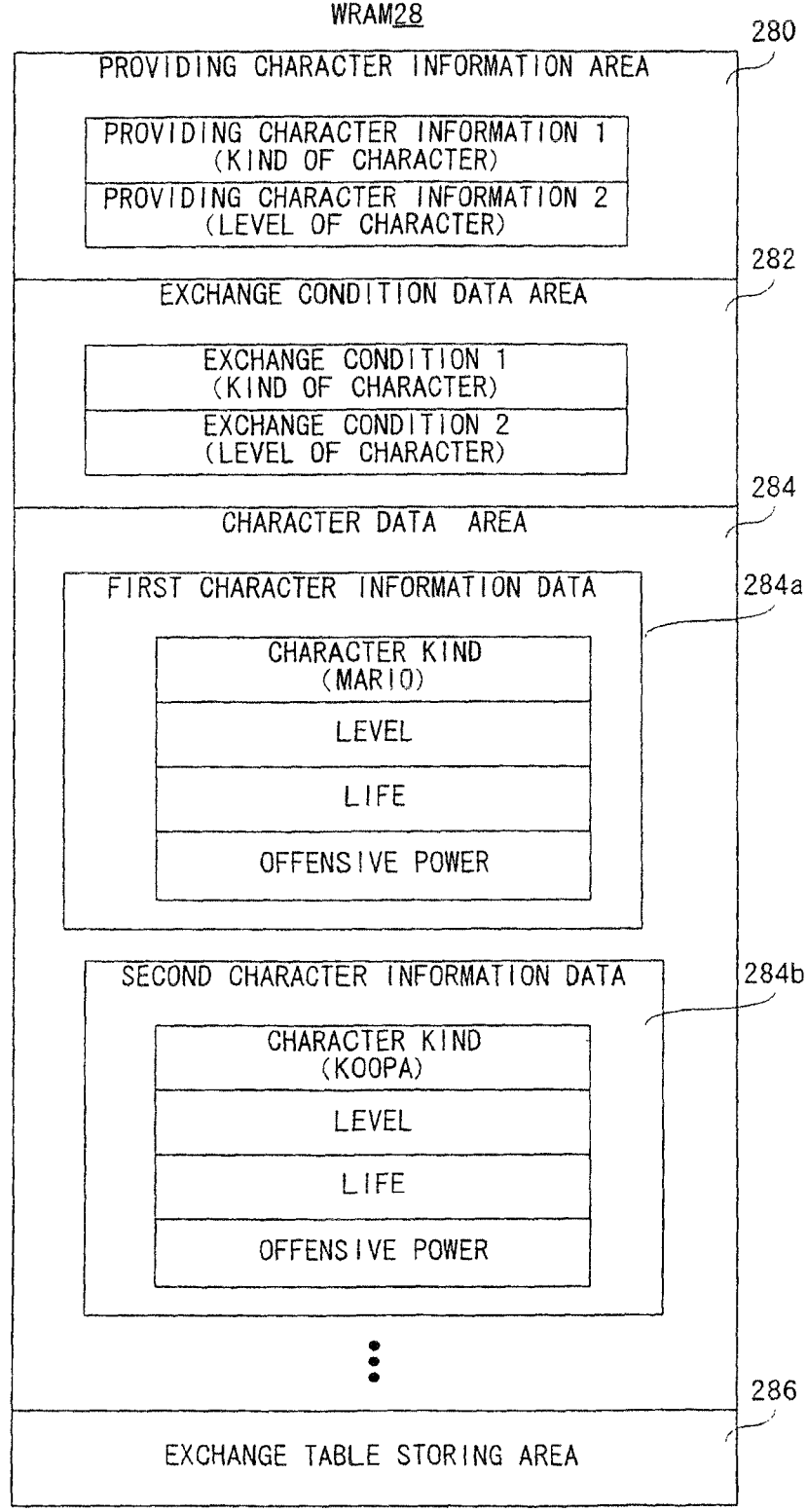
FIG. 2 is an illustrative view showing a memory map of a WRAM provided in a mobile game machine shown in FIG. 1.

FIG. 2 shows a memory map of the WRAM 28. In this embodiment, the WRAM 28 includes a providing character information area 280, an exchange condition data area 282, a character data area 284, and an exchange table storing area 286.

The providing character information area 280 stores information (character's kind, level, etc.) with respect to a character that is selected to be provided to another player or a user (hereinafter, may be briefly referred to as "player") out of game characters (hereinafter, may be briefly referred to as "character") possessed by one player. Herein, providing character information 1 is information indicative of a kind of a providing character, and providing character information 2 is information indicative of a level of the providing character. Furthermore, data stored in the providing character information area 280 is for copying and storing data of the providing character out of data stored in the character data area 284, and in a game data exchange processing, directly referring to the character data area 284 eliminates the need for another providing character information storing area.

A character to be provided to another player out of the possessed characters is selected by inputting (designating) by use of the operation switch 38 of the player, or automatically selected on the basis of progress of the game.

The exchange condition data area 282 stores information (character's kind, level, etc.) relating to a character required to be provided from another player as an exchange condition. The kind of the character is set to an exchange condition 1, and the level thereof is set to an exchange condition 2. The exchange condition is input (designated) by use of the operation switch 38 of the player or automatically determined on the basis of the progress of the game.

The character data area 284 stores information (character information) with respect to characters (characters having character names of "Mario", "Luigi", "Koopa", "Peach", etc. in this embodiment) possessed by the player for each character. The player advances in an adventure while capturing characters that exist in a game world and taking them into his party in a virtual game world. Information relating to the characters thus captured or taken into his party is stored in the character data storing area 284. As can be understood from FIG. 2, the character information includes the kind and level of the character and an attribute value of the character, i.e., a life force (life) and an offensive power (hit point). For example, the character data area 284 stores first character information data 284a, and a second character information data 284b in this embodiment. If the player possesses more than three characters, third character information data, forth character information data, etc. may be stored successive to the above description.

The character information data (data in the character data area 284) is updated at any time in correspondence with the progress of the game. For example, when capturing a new character, the character information with respect to the new character is added. Furthermore, in a case of a level up the character that has already been captured, a value of the level of the character is updated.

In addition, the character information data is stored (saved) in the backup RAM 44 in response to an instruction of the player, or in accordance with the progress of the game. Therefore, in a case of resuming the game from the portion that the player last played, the character information data stored in the backup RAM 44 is read, and written (loaded) to the character data area 284.

Figure 3:
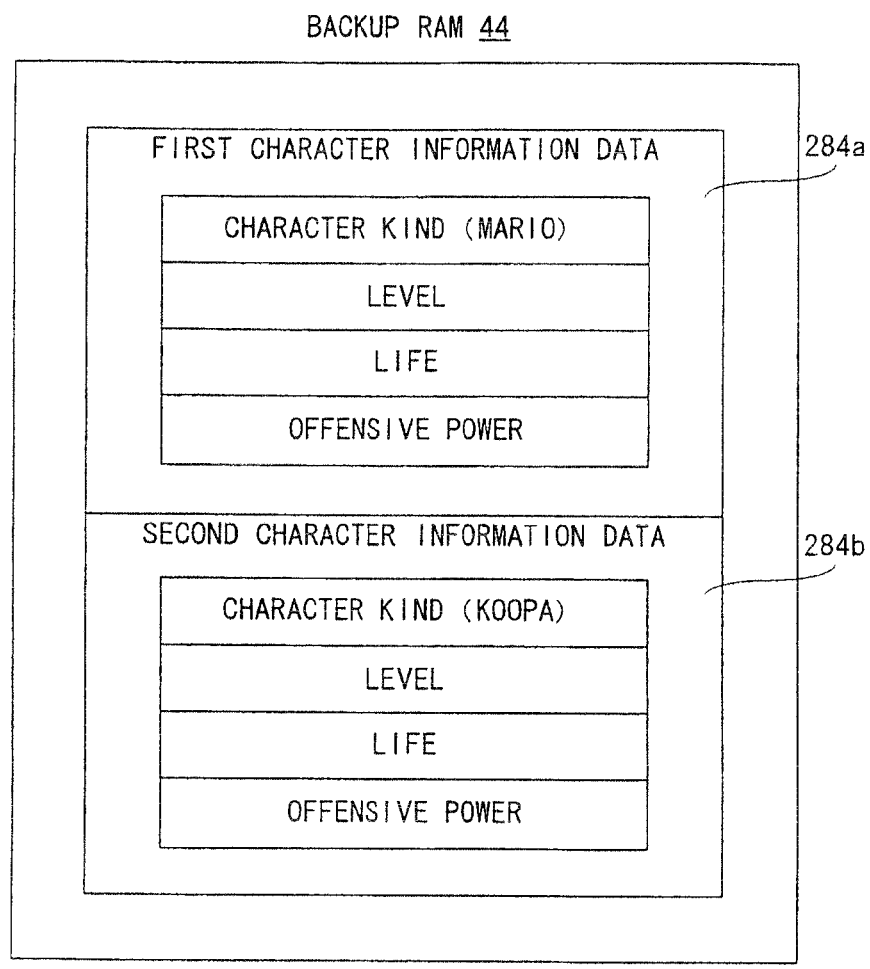
FIG. 3 is an illustrative view showing a memory map of a backup RAM provided in a cartridge shown in FIG. 1.

FIG. 3 shows a memory map of the backup RAM 44. As described above, the backup RAM 44 stores the saved game data, i.e., the character information data. In this embodiment, the backup RAM 44, for example, stores the first character information data 284a and the second character information data 284b.

Returning to FIG. 2, the exchange table storing area 286 stores a table by which the game data is exchanged when the progress of the game in the virtual game satisfies a predetermined condition. In the table, as shown in FIG. 4, an exchange starting condition, an exchange ending condition, providing character designating data, required character designating data are stored in correspondence to the progress of the virtual game. With reference to the table, the providing character and the exchange condition are set to correspond to the progress of the virtual game, and this makes it possible to exchange the game data.

The exchange starting condition is a condition for starting the exchange of the game data, and satisfying the condition causes a state in which a predetermined character becomes exchangeable as described later. For example, as the exchange starting condition, acquiring (obtaining) a specific item, defeating a specific enemy character (non-player character whose action and movement are controlled according to a game program regardless of an operation of the player), saving a specific non-player character (non-player character except for the enemy character), complying with such the non-player character, setting in a specific month and day (it is possible if one of them), coming at a specific hour, and so forth are relevant in this embodiment.

As the exchange ending condition, the specific month and date (it is possible if one of them, and determined in correspondence with the exchange starting condition), and the specific hour are relevant. It is noted that in the exchange table, an item indicated by a cross bar requires no specific exchange ending condition, and with respect to the item, exchanging the characters signals the end of the exchanging process.

The designating data of the providing character is data for setting the providing character, and includes items (conditions) of the kind and level of the character to be provided. In the item of the kind, the kind (name of the character in this embodiment) of the providing character is described, and in the item of the level, the level of the corresponding character is described. It is determined whether or not a character that satisfies the condition (kind and level) out of the possessed characters is present on the basis of the above description, and in a case that the character that satisfies the condition is present, the character is selected as the providing character, and the information (kind and level of the character, etc.) with respect to the character is stored in the above-described providing character information area 280. It is noted that the character to be provided can be designated at player's discretion. In this case, a character designated at player's discretion out of the possessed characters is selected as the providing character, and the information with respect to the character is stored in the above-described providing character information storing area 280.

It is noted that as to the exchange table, in a case the player can designate the kind and the level, a description is "at player's discretion" while in a case of not being designated especially, the description is "no designation". This is true hereunder.

The designating data of the required character is data for setting the exchange condition, and includes items (conditions) of the kind and level of the character required to be provided from another player. In the item of the kind, the kind (name of the character in this embodiment) of the character to be required is described, and in the item of the level, the level of the corresponding character is described. Then, the exchange condition is determined on the basis of the description. It is noted that the kind of the character to be required can be designated at player's discretion. Furthermore, in a case of not being designated especially as to the level, it is possible that a level more than that of the providing character is designated, and it is possible that the level is designated at player's discretion. The exchange condition thus determined is stored in the exchange condition data area 282.

More specifically, with reference to the exchange table, in number 1, the exchange starting condition is "acquiring a specific item", and the exchange ending condition is not especially described. As a condition of the providing character, the kind is "Mario", and the level thereof is "5". As a condition of the required character, the kind is "Koopa", and the level thereof is "5". That is, when the player character acquires the specific item in the game world, having Mario at level 5 is exchangeable for Koopa at level 5 possessed by another player. In this case, in the providing character information storing area 280, "Mario" is set to the kind of the providing character, and "5" is set to the level thereof. Then, in the exchange condition storing area 282, "Koopa" is set to the kind of the required character, and "5" is set to the level thereof.

Furthermore, in number 4, the exchange starting condition is "specific month and day (April 10)", and the exchange ending condition that is correlated with the exchange starting condition is "specific month and day (April 15). As the condition of the providing character, the kind is "Koopa", and the level thereof is "10 or more". As the condition of the required character, the kind of the character is "at player's discretion", and the level thereof is "more than the level of the providing character". That is, the mobile game machine 12 of the present invention is provided with a timer, and a date of the game world is governed by the timer. Then, during April 10 and April 15 in the game world, a player who possesses a Koopa of level 10 or more is allowed to exchange it with an arbitrary character having a level more than that of the Koopa. For example, a player who possesses a Koopa of level 15 can desire to exchange it with a Luigi having a level more than the level 15. In this case, in the providing character information storing area 280, "Koopa" is set to the kind of the providing character, and "15" is set to the level thereof. Then, in the exchange condition data storing area 282, "Luigi" is set to the kind of the required character, and "15 or more" is set to the level thereof.

Such an exchange table, determined in advance by a developer such as a programmer, etc., is stored in the ROM 42 of the cartridge 16 (although not illustrated), and loaded into the WRAM 28 at a time or as necessary after a main power source of the mobile game machine 12 is turned on. The providing character and the exchange condition (required character) are automatically set with reference to the exchange table, but a part or all of them can be set at player's discretion.

It is noted that the exchange table shown in FIG. 4 is a simple illustration, and there is no need to be restricted thereto.

For example, in the game system of this embodiment, at least two mobile game apparatuses 10 shown in FIG. 1 are utilized and communicate with each other, and whereby, a player of each mobile game apparatus 10 can enjoy playing the communication game. That is, a dotted line 64 in FIG. 5 indicates a communicable range (a range capable of making a communication) of a user's mobile game apparatus 62, and the mobile game apparatus 62 can communicate (radio-communicate) the mobile game apparatus existing within the communicable range 64. This communicable range 64 is a range capable of performing a data communication between the parent device and the child device by the above-described weak radio wave, and any of a plurality of the mobile game apparatuses existing within the communicable range 64 can arbitrarily become the parent device or the child device.

Figure 5:
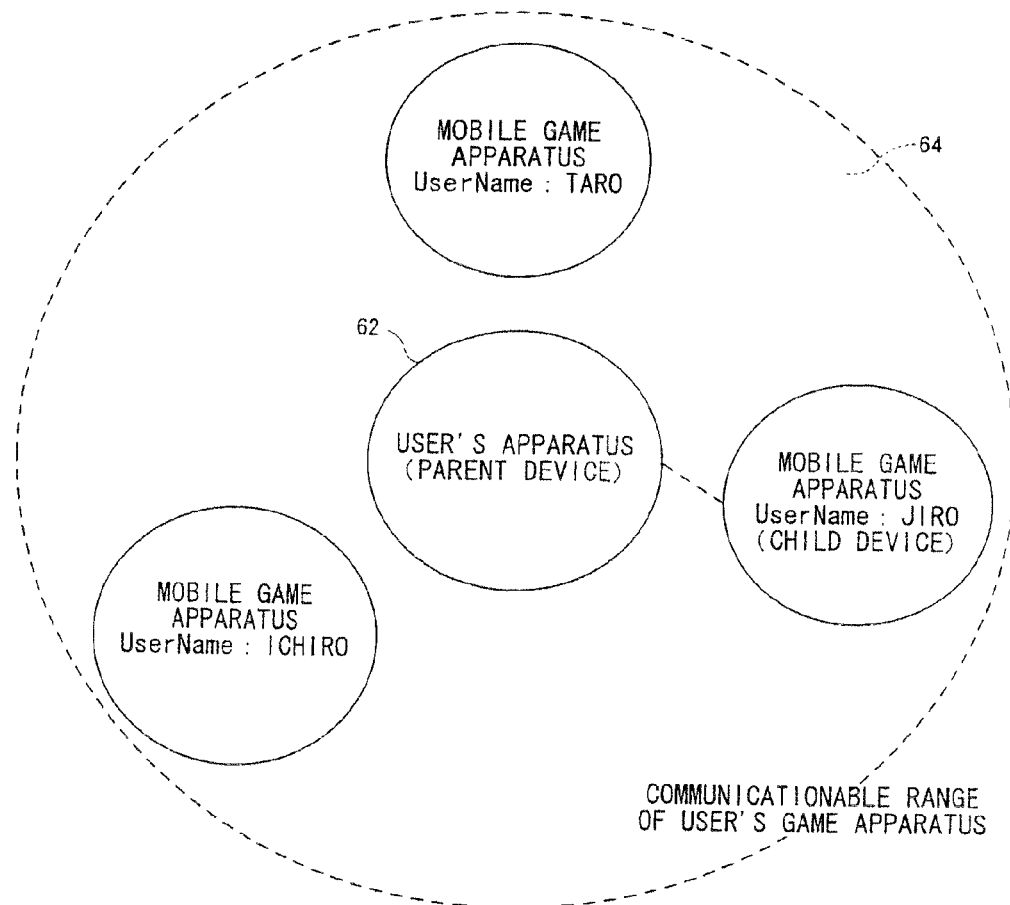
FIG. 5 is an illustrative view for explaining an outline of a game system utilizing the mobile game apparatus shown in FIG. 1 embodiment.

It is noted that in FIG. 5, a manner in which mobile game apparatuses having the user's names as "Taro", "Ichiro", and "Jiro" exist within the communicable range 64 of the user's mobile game apparatus 62, and the user's mobile game apparatus 62 radio-communicates with the mobile game apparatus having the user's name of "Jiro" is displayed.

An operation of the mobile game apparatus 62 for applying for an entry to another mobile game apparatus existing within the communicable range 64 so as to enjoy playing the communication game between a plurality of the game apparatuses is not an essential content of the present invention, and therefore, a detailed description thereof is omitted herein.

When two or more mobile game apparatuses are communicably connected, the player of each mobile game apparatus can enjoy playing the communication game described above. It is noted that it is needless to say that each player can enjoy playing the game by use of the mobile game apparatus of his own, that is, without communicating or individually. It is noted that a mode in which a game is played with communication or individually is referred to as a game mode hereunder.

In addition, the mobile game apparatus 62 can exchange the game data, i.e., the character information data with any one of the mobile game apparatuses exist within the communicationable range 64. Briefly, with respect to the user's mobile game apparatus 62, if in a state that its power source is turned on, and the game is not played (the game is not started or the game is over), that is, it is not in the game mode, an exchange mode of the characters can be set.

In an exchangeable state of the exchange mode, the mobile game apparatus 62 searches another game apparatus that exists within the communicable range 64 and is similarly in the exchangeable state. At this time, the mobile game apparatus 62 alternately repeats a process of searching the child device as the parent device and a process of searching the parent device as the child device. Then, when finding another communicable mobile game apparatus, the radio communication attempts to establish the connected state (communicated state). A description of the searching and connecting process is made in detail later (see FIG. 16 to FIG. 20).

When the connected state is established with another mobile game apparatus described above, the user's mobile game apparatus 62 exchanges the providing character information (kind information and level information of the providing character) and exchanges conditions with each other, and determines whether or not the exchange conditions are coincident (matched) with each other. In a case that the exchange conditions are coincident, both of the data of the providing character are exchanged.

Figure 6:
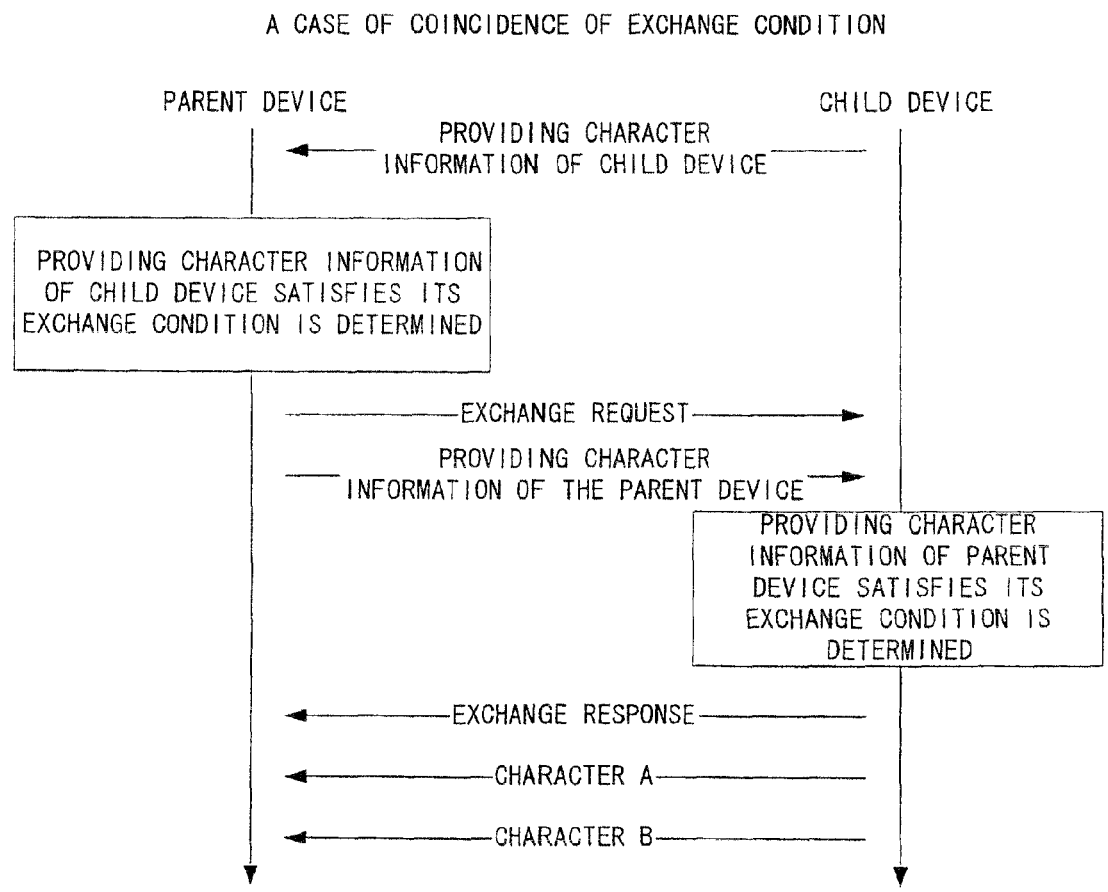
FIG. 6 is an illustrative view for showing a flow in a case game data are exchanged between a parent device and a child device in a game system of the present invention.

FIG. 6 is an illustrative view showing a flow of an exchange between two mobile game apparatuses (parent device and child device) in a case that the exchange conditions are coincident with each other. Referring to FIG. 6, when the connected state is established between the parent device and the child device, the child device transmits to the parent device providing character information 1 and providing character information 2 of its own. When receiving the providing character information 1 and the providing character information 2 of the child device, the parent device respectively compares them with the exchange conditions 1 and 2 of its own, and determines whether or not they are coincident with each other. If each of them is coincident, that is, if the providing character information 1 and the providing character information 2 of the child device satisfy the exchange condition 1 and exchange condition 2 of the parent device, the parent device transmits an exchange request to the child device, and further transmits the providing character information 1 and providing character information 2 of its own to the child device.

When receiving the providing character information 1 and providing character information 2 of the parent device, the child device respectively compares them with the exchange conditions 1 and 2 of its own, and determines whether or not they are coincident. If each of them is coincident, that is, if the providing character information 1 and the providing character information 2 of the parent device satisfy the exchange condition 1 and exchange condition 2 of child device's own, the exchange conditions are satisfied, and the child device transmits to the parent device an exchange response.

Thereupon, the parent device receives the exchange response, and transmits to the child device the character information data of its own providing character (for convenience in writing, referred to as "character A" in FIG. 6). Then, the child device transmits to the parent device the character information data of its own providing character (for convenience in writing, referred to as "character B" in FIG. 6). Thus, the exchange of the characters is executed between the parent device and the child device.

It is noted that in this embodiment, as shown in FIG. 6, the parent device and the child device transmit the providing character information to each other, and then, each of the mobile game apparatuses receiving it determines whether or not the exchange condition is satisfied. However, one mobile game apparatus (e.g., child device) transmits to other mobile game apparatus (e.g., parent device) the providing character information and exchange condition of its own, and then, the parent device may determine whether or not the exchange condition is satisfied at a time.

Furthermore, in this embodiment, as shown in FIG. 6, the child device transmits the providing character information, then, the parent device which has received the same determines whether or not the exchange condition of its own is satisfied, and if it is determined that the condition is satisfied, the exchange request is transmitted. This is done to eliminate a needless communication. Specifically, if the condition is not satisfied, the exchange of the characters is interrupted as it is. That is, the providing character is not transmitted from the parent device.

In addition, as described above, the image data of each character is stored in the ROM 42 of the cartridge 16, and although in order to efficiently lessen a time taken for the communication by reducing a data amount to be received and transmitted, an identifying number for designating the kind of the character is exchanged at a time of exchanging the characters in this embodiment, image data, and the like of the character to be exchanged is exchangeable.

In embodiments to be described later with reference to FIG. 7 et seq., an exchange process is executed in parallel with executing the game play without discriminating a game mode from an exchange mode. That is, during the game play, another game apparatus satisfying the exchange condition is searched, and when finding another game apparatus satisfying the exchange condition, an exchange process of the game data is performed. Thus, this makes it possible to play the game while searching for another game apparatus that satisfies the exchange condition, keeping the player from being bored.

Figure 7:
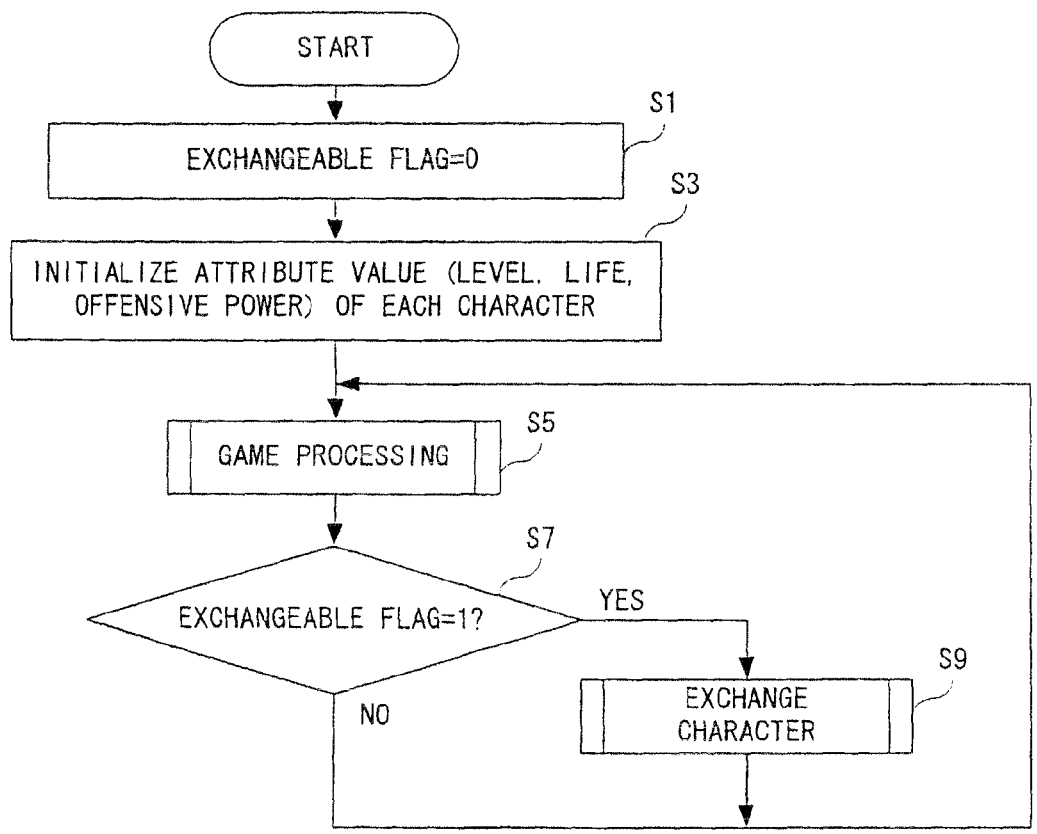
FIG. 7 is a flowchart showing one example of a main flow of the mobile game machine shown in FIG. 1.

More specifically, the processor 20 or the CPU core 22 of the mobile game machine 12 performs a process according to a flowchart shown in FIG. 7. When the main power source of the mobile game machine 12 is turned on, the CPU core 22 starts the process, and turns an exchangeable flag off (set to 0) in step S1. Next, in step 3, an attribute value of each character (character possessed in an initial state) such as a level, a life, and an offensive power is initialized. It is noted that the process in step S3 is a process performed only when playing the game at first time, and is not performed when playing after the second time.

In the following step, step S5, a game process (see FIG. 8 to FIG. 11) described later in detail is executed. It is determined whether or not the exchangeable flag is turned on (=1) in step S7. If "NO" in step S7, that is, if the exchangeable flag is turned off (=0), determining that it is impossible to exchange the characters, the process directly returns to step S5.

On the other hand, if "YES" in step S7, that is, if the exchangeable flag is turned on (=1), determining that it is possible to exchange the characters, a character exchange process (FIG. 12 to FIG. 15) described later is executed in step S9, and then, the process returns to step S5.

Figure 8:
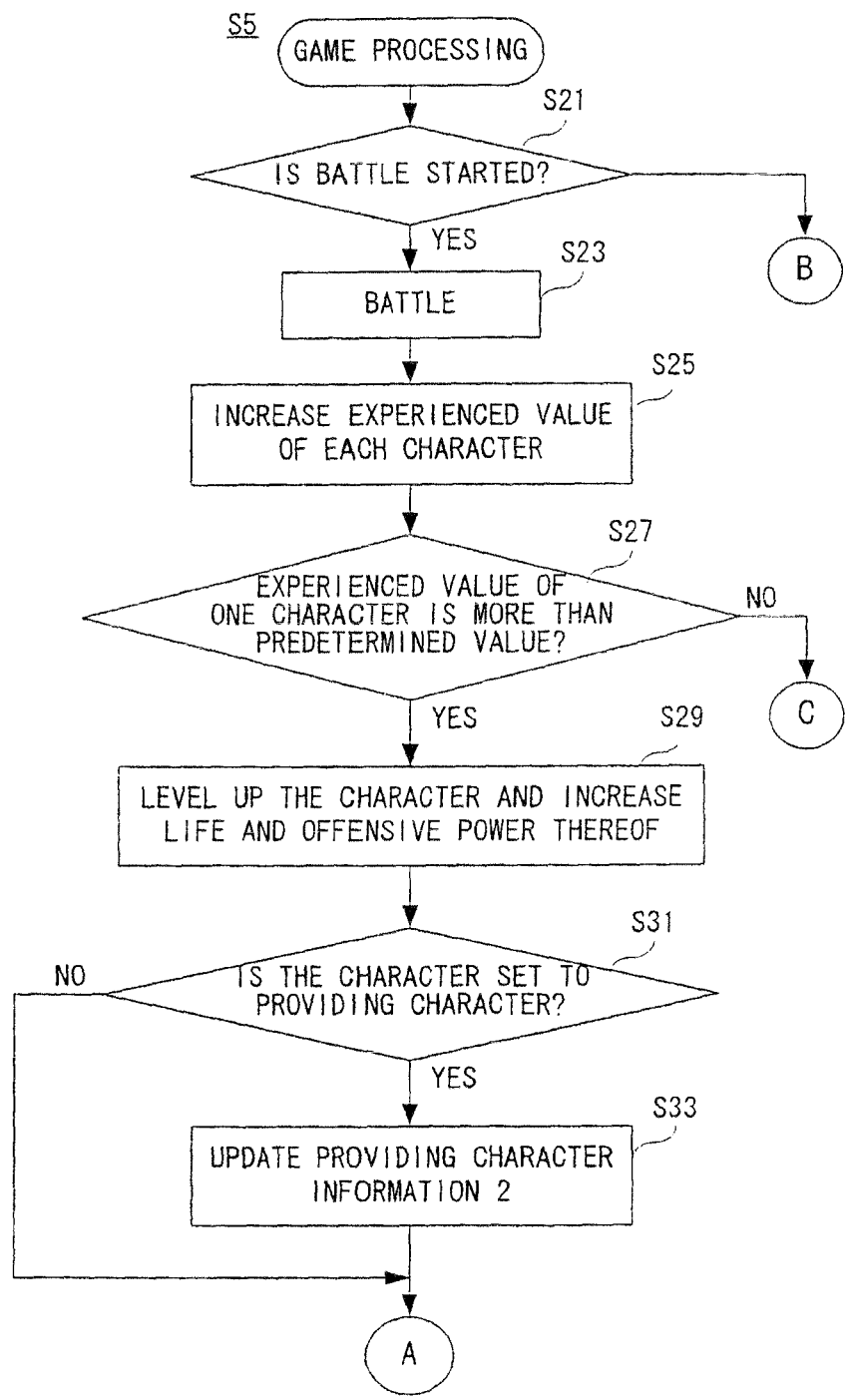
FIG. 8 is a flowchart showing a part of a game process of the mobile game machine shown in FIG. 1.

As shown in FIG. 8, when the game process is started, it is determined whether or not a battle is started in step S21. That is, it is determined whether or not to shift to a battle scene. Although not illustrated, when a leading character (player character) encounters an opponent character (enemy character), the battle scene is started. If "NO" in step S21, that is, if the battle is not started, the process proceeds to step S43 shown in FIG. 10. On the other hand, if "YES" in step S21, that is, if the battle is started, a battle processing is executed in step S23, and an experienced value of a character that enters the battle out of characters possessed by the player character is increased in step S25.

It is noted that some of the plurality of characters stored in the character data area 284 are selected by the player before the game, and in the game processing shown in FIG. 8, the selected characters are used.

Furthermore, it is noted that although not illustrated in detail, in the battle processing in step S23, for example, the characters possessed by the player character and the enemy character are attacked with each other. In the battle processing, an offensive turn is alternately changed between the player character and the enemy character. Then, when the life of all the characters possessed by the player character or the enemy character is ended (becomes 0), the battle is ended.

In addition, the reason why the experienced value of the character that enters the battle out of the characters possessed by the player character is increased in step S25 is based on the premise that the player character wins the battle. It is noted that if the player character loses the battle in the battle processing, the game is ended (game over), and then, the game processing is directly ended (returned).

Next, in succeeding step S27, it is determined whether or not the experience value of a certain character is more than a predetermined value. That is, it is determined whether or not the character having the experience value more than the predetermined value out of the characters possessed by the player character is present. Herein, the predetermined value is a value set by a developer such as a programmer, etc. in advance, and is updated according to the progress of the game or depending on the level of the character.

Figure 9:
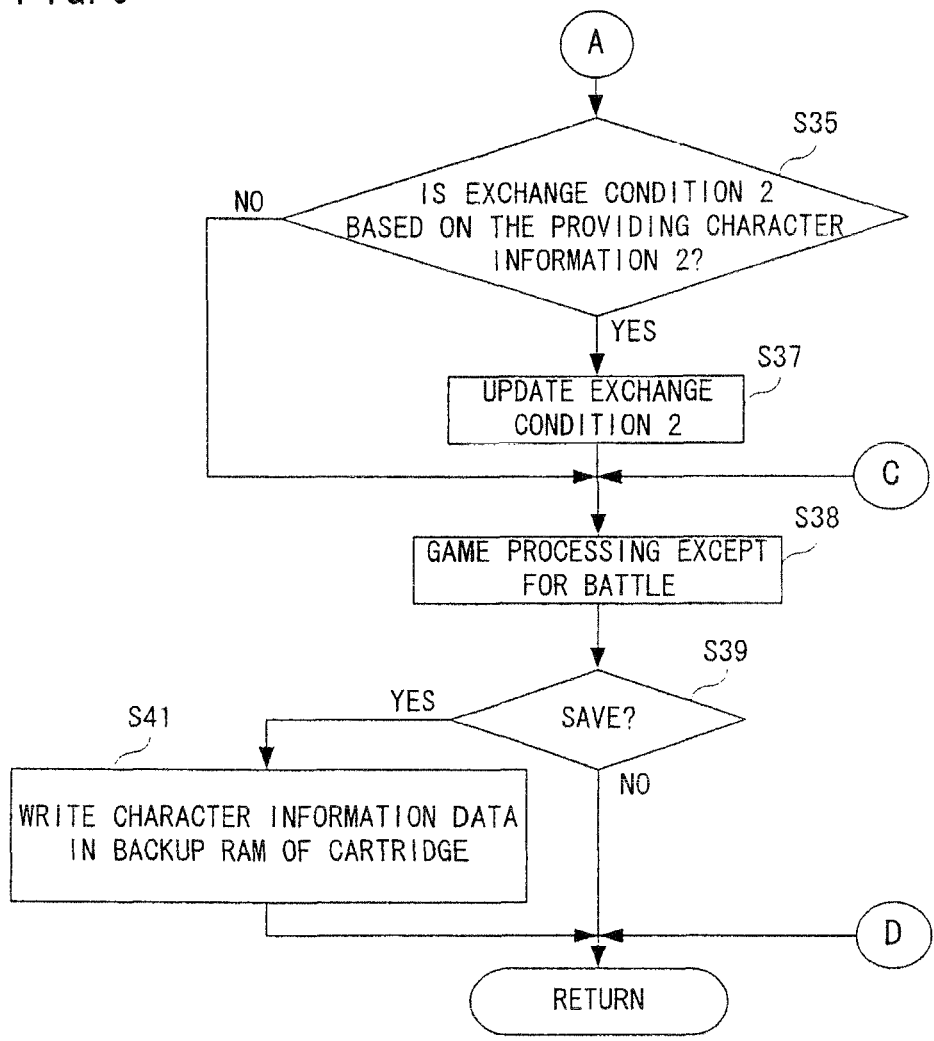
FIG. 9 is a flowchart showing another part of the game process of the mobile game machine shown in FIG. 1.

If "NO" in step S27, that is, if the experienced value of the character is not more than the predetermined value, the process directly proceeds to step S38 shown in FIG. 9. On the other hand, if "YES" in step S27, that is, if the experienced value of the character is more than the predetermined value, the character is leveled up, and the life and offensive power thereof are increased in step S29. That is, the character information data with respect to the character stored in the character data area 284 of the WRAM 28 is updated.

In succeeding step S31, it is determined whether or not the character is set to the providing character. If "NO" in step S31, that is, if the character is not set to the providing character, the process directly proceeds to step S35 shown in FIG. 9. However, if "YES" in step S31, that is, if the character is set to the providing character, the data of the providing character information 2 stored in the providing character information area 280 of the WRAM 28 is updated, that is, the data of the level is updated in step S33, and then, the process proceeds to step S35. This is because when the level of the character data that is set to the providing character is increased, the providing character information is required to be changed correspondingly.

In step S35 shown in FIG. 9, it is determined whether or not the exchange condition 2 is based on the providing character information 2. That is, it is determined whether or not the level of the required character is determined based on the level of the providing character. For example, in this embodiment, as in number 4 and number 5 of the exchange table shown in FIG. 4, if the level indicated by the exchange condition 2 and the level indicated by the providing character information 2 are coincident with each other, a case of exceeding the level is applied. If "NO" in step S35, that is, if the exchange condition 2 is not based on the providing character information 2, the process directly proceeds to step S38. However, if "YES" in step S35, that is, if the exchange condition 2 is based on the providing character information 2, the data of the exchange condition 2 stored in the exchange condition data storing area 282 of the WRAM 28 is updated in step S37, and then, the process proceeds to step S38. For example, if number 4, a Koopa of level 15 is set to the providing character, and when the Koopa is leveled up to a level 16, the data of the exchange condition 2 is changed from "level 15 or more" to "level 16 or more".

In step S38, a processing of the virtual game except for the battle processing is performed. For example, a processing of moving the player character and the enemy character in the virtual game world, a processing of adding, when the player character acquires an item existing in the game world, the item to player character's possessing item list, a processing of generating an event for saving a villager character existing in the game world, etc. are performed. After the process in step S38, the process proceeds to step S39.

In step S39, it is determined whether or not the game data (i.e., the character information data) is to be saved. Herein, a determination is made depending on whether or not an operation of the player is present, or whether or not the predetermined event is generated. If "NO" in step S39, that is, if the character information data is not saved, the game processing is returned as it is. On the other hand, if "YES in step S39, that is, if the character information data is saved, all the character information data stored in the character data storing area 284 of the WRAM 28 is read and written (overwritten) to the backup RAM 44 provided in the cartridge 16 in step S41, and then, the process returns the game processing.

Figure 10:
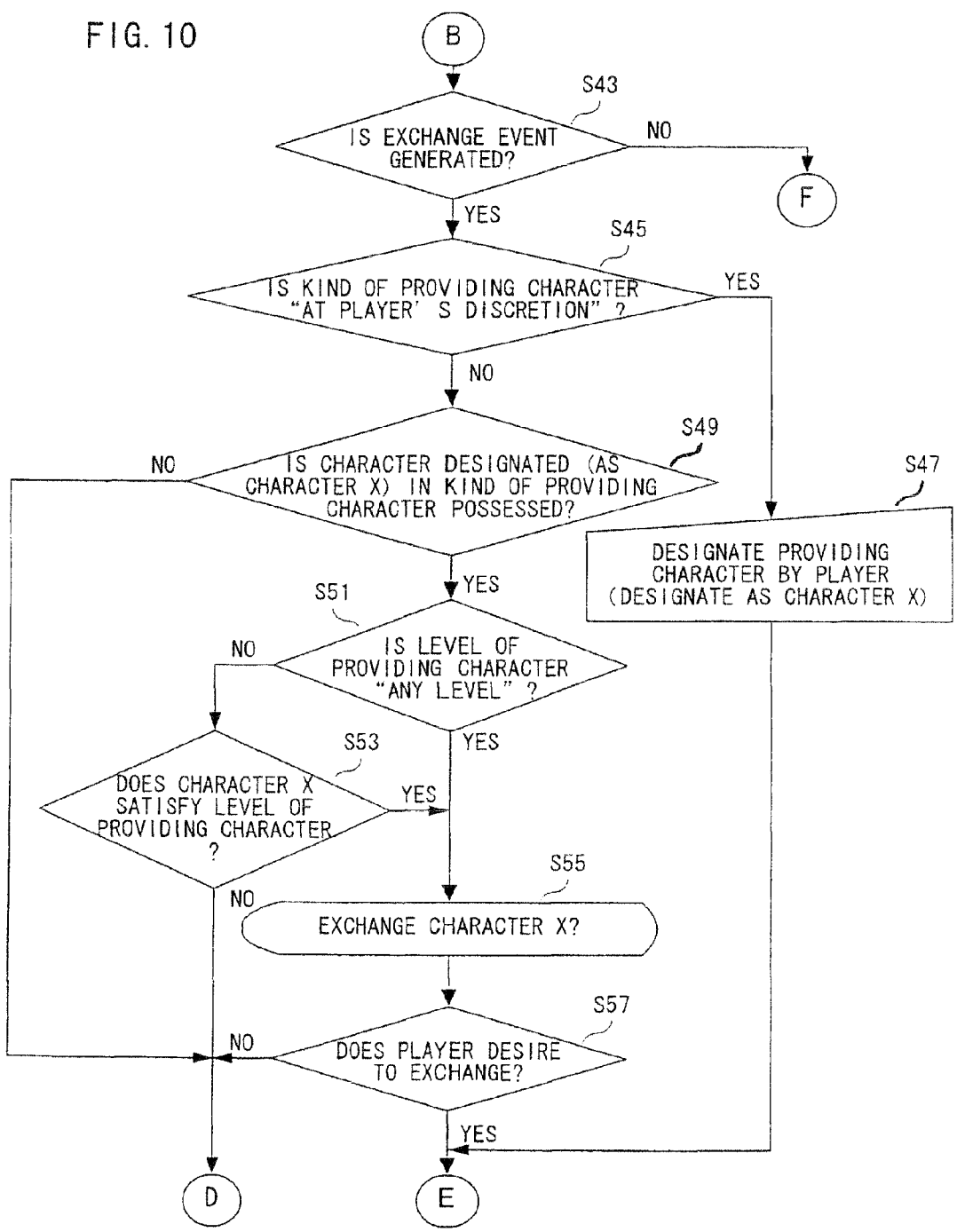
FIG. 10 is a flowchart showing the other part of the game process of the mobile game machine shown in FIG. 1.

Furthermore, if it is determined the battle is not started in step S21 shown in FIG. 8, it is determined whether or not an exchange event is generated in step S43 shown in FIG. 10. That is, it is determined whether or not the progress of the virtual game satisfies any one of the exchange starting conditions of the exchange table shown in FIG. 4. If "NO" in step S43, that is, if no exchange starting condition is satisfied, the process proceeds to step S71 shown in FIG. 11.

On the other hand, if "YES" in step S43, that is, if any one of the exchange starting conditions is satisfied, it is determined whether or not the kind of the providing character corresponding to the exchange starting condition is "at player's discretion" with reference to the exchange table in step S45. If "YES" in step S45, that is, if the kind of the providing character is "at player's discretion", a providing character out of the possessed characters is designated by the player in step S47, and then the process proceeds to step S59 shown in FIG. 11. For example, in step S47, a selection screen in which a list of the possessed characters is displayed so as to select the providing character is displayed on the LCD 18, and by viewing the selection screen, the player selects (designates) a desired providing character by operating the operation switch 38. Hereinafter, for convenience in writing, the character selected as the providing character is called as a "character X".

If "NO" in step S45, that is, if the kind of the providing character is not "at player's discretion", it is determined whether or not the character designated in the kind of the providing character is possessed with reference to the exchange table in step S49. If "NO" in step S49, that is, if the character designated in the kind of the providing character is not possessed, it is determined the character to be exchanged is not possessed, the game processing is ended as it is as shown in FIG. 9. On the other hand, if "YES" in step S49, that is, if the character designated in the kind of the providing character is possessed, the character is rendered character X (i.e., designated as the providing character), and it is determined whether or not the level of the providing character is "any level" with reference to the exchange table in step S51.

If "YES" in step S51, that is, if the level of the providing character is "any level", the process directly proceeds to step S55. On the other hand, if "NO" in step S51, that is, if the level of the providing character is not "any level", it is determined whether the character X satisfies the level of the providing character in step S53. That is, it is determined whether or not the level included in the character information data of the character X is the same as that of the providing character.

If "NO" in step S53, that is, if the character X does not satisfy the level of the providing character, it is determined the character X is not exchangeable, and then, the game process is returned as it is. On the other hand, if "YES" in step S53, that is, if the character X satisfies the level of the providing character, the process proceeds to step S55.

In step S55, a confirmation message asking, "IS CHARACTER X EXCHANGEABLE?" is displayed on the LCD 18. Then, it is determined whether or not the player desires to exchange the player character X in step S57. That is, it is determined whether or not the player consents to exchange the character X by operating the operation switch 38.

If "NO" in step S57, that is, if the player does not desire to exchange the character X, the game process is ended as it is. On the other hand, if "YES" in step S57, that is, if the player desires to exchange the character X, the process proceeds to step S59 shown in FIG. 11.

Thus, the player is inquired whether or not the character X is to be exchanged, and therefore, it is possible to prevent the character that is not intended by the player from being erroneously exchanged.

Next, it is determined whether or not the kind of the required character corresponding to the exchange starting condition is "at player's discretion" with reference to the exchange table in step S59. If "NO" in step S59, that is, if the kind of the required character is not "at player's discretion", the process directly proceeds to step S63. However, if "YES" in step S59, that is, if the kind of the required character is "at player's discretion" in step S61, the kind of the required character is designated by the player, and then, the process proceeds to step S63. In step S61, for example, the selection screen on which a list of all (or main) characters appearing in the game is displayed so as to cause the player to select an arbitrary character from the list is displayed on the LCD 18, and the player selects (designates) a desired required character by viewing the selection screen.

In step S63, it is determined whether or not the level of the required character corresponding to the exchange starting condition is "at player's discretion" with reference to the exchange table. If "NO" in step S63, that is, if the level of the required character is not "at player's discretion", the process directly proceeds to step S67. On the other hand, if "YES" in step S63, that is, if the level of the required character is "at player's discretion", the level of the required character is designated by the player in step S65, and then, the process advances a process to step S67. The designation of the level of the required character is approximately the same as the designation of the kind of the character in above-described steps S47 and S61, and therefore, a detailed description is omitted herein.

In step S67, each of the providing character information 1, providing character information 2, exchange condition 1, and exchange condition 2 are set (determined). That is, providing character information 1 and providing character information 2 are stored in providing character information area 280, and exchange condition 1 and exchange condition 2 are stored in exchange condition data area 282. Then, the exchangeable flag is turned on (set to 1) in step S69, and then, the game processing is returned as shown in FIG. 9. In this embodiment, the kind of character X is set to the providing character information 1, the level of character X is set to providing character information 2, the kind of the required character is set to exchange condition 1, and the level of the required character is set to the exchange condition 2 in step S67. That is, the kind and level of the providing character and the required character are respectively set according to a designation by the player or a definition of the exchange table.

Figure 11:
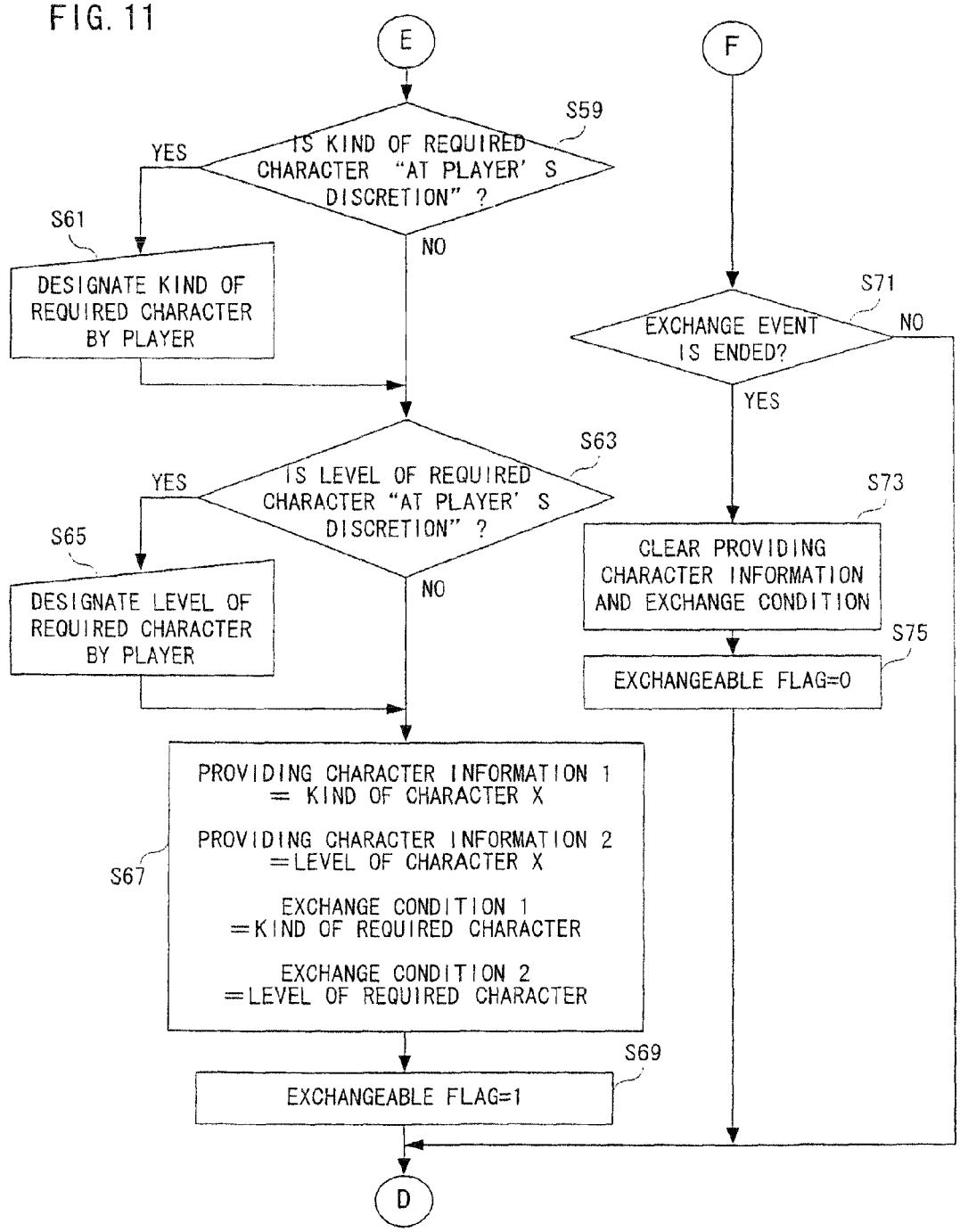
FIG. 11 is a flowchart showing a further part of the game process of the mobile game machine shown in FIG. 1.
Figure 12:
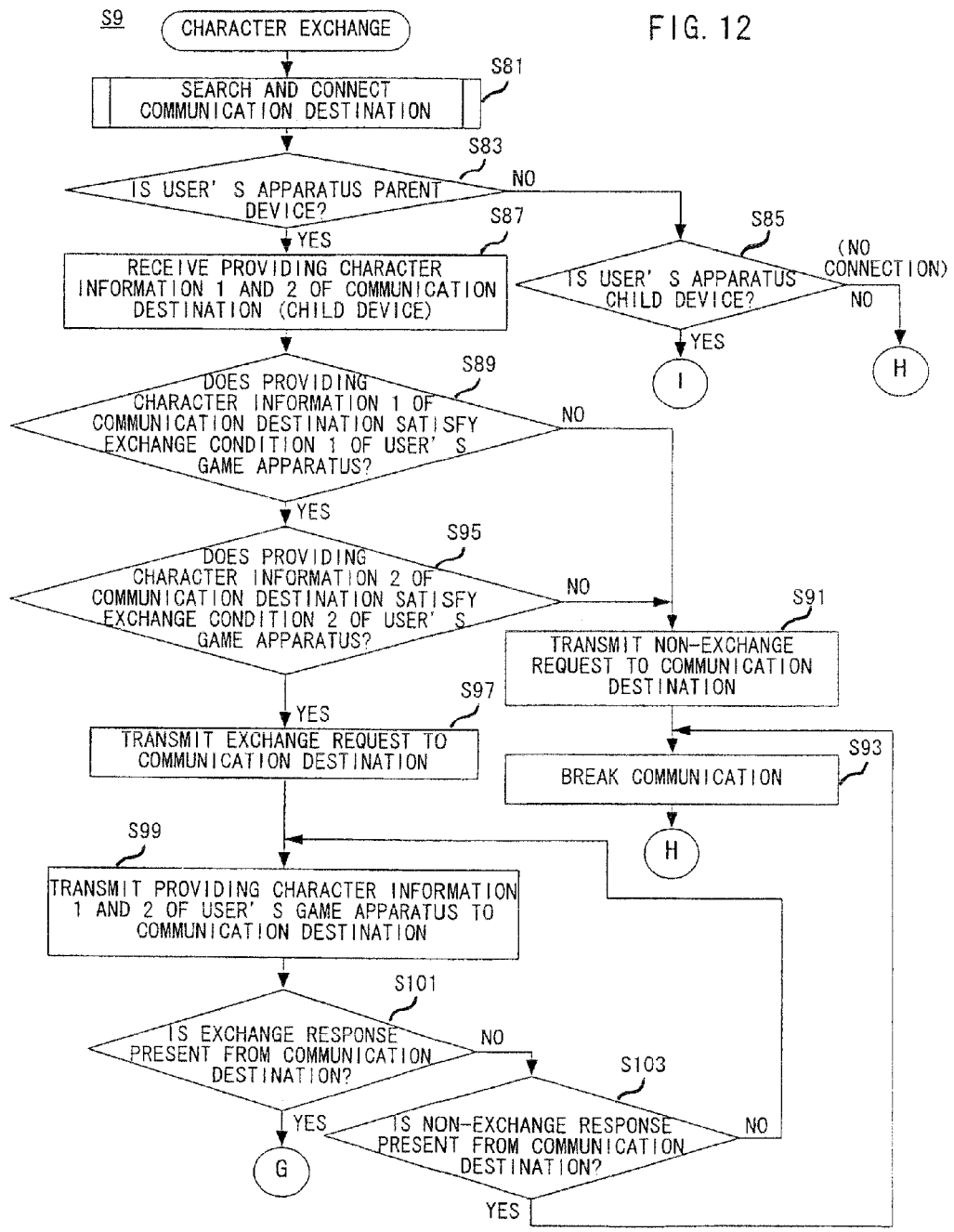
FIG. 12 is a flowchart showing a part of a character exchange process of the mobile game machine shown in FIG. 1.

Furthermore, if it is determined the exchange starting condition is not satisfied in step S43 shown in FIG. 10, the process proceeds to FIG. 11, and then, it is determined whether or not the exchange ending condition is satisfied in step S71. If "NO" in step S71, that is, the exchange ending condition is not satisfied, the game process is directly returned. On the other hand, if "YES" in step S71, that is, if the exchange ending condition is satisfied, the providing character information and the exchange condition are cleared in step S73, the exchangeable flag is turned off (set to 0) in step S75, and then, the game processing is returned.

Furthermore, when starting the character exchange processing in step S9 shown in FIG. 7 is started, a processing of searching and connecting with the communication destination described later is executed in step S81 (see FIG. 18, FIG. 19, and FIG. 20). Next, in step S83, it is determined whether or not the user's mobile game apparatus is the parent device. That is, it is determined whether or not a communication is established with another mobile game apparatus as the parent device depending upon whether or not a parent device flag is turned on. It is noted that the parent device flag is a flag that is turned on when being connected with another mobile game apparatus as the parent device in the communication destination searching and connecting processing described later.

If "NO" in step S83, that is, if the user's mobile game apparatus is not the parent device, it is determined whether or not the user's mobile game apparatus is the child device in step S85. That is, it is determined whether or not a communication is established with another mobile game apparatus as the child device depending upon whether or not a child device flag is turned on. It is noted that the child device flag is a flag that is turned on when being connected with another mobile game apparatus as the child device in the communication destination searching and connecting processing described later.

Figure 13:
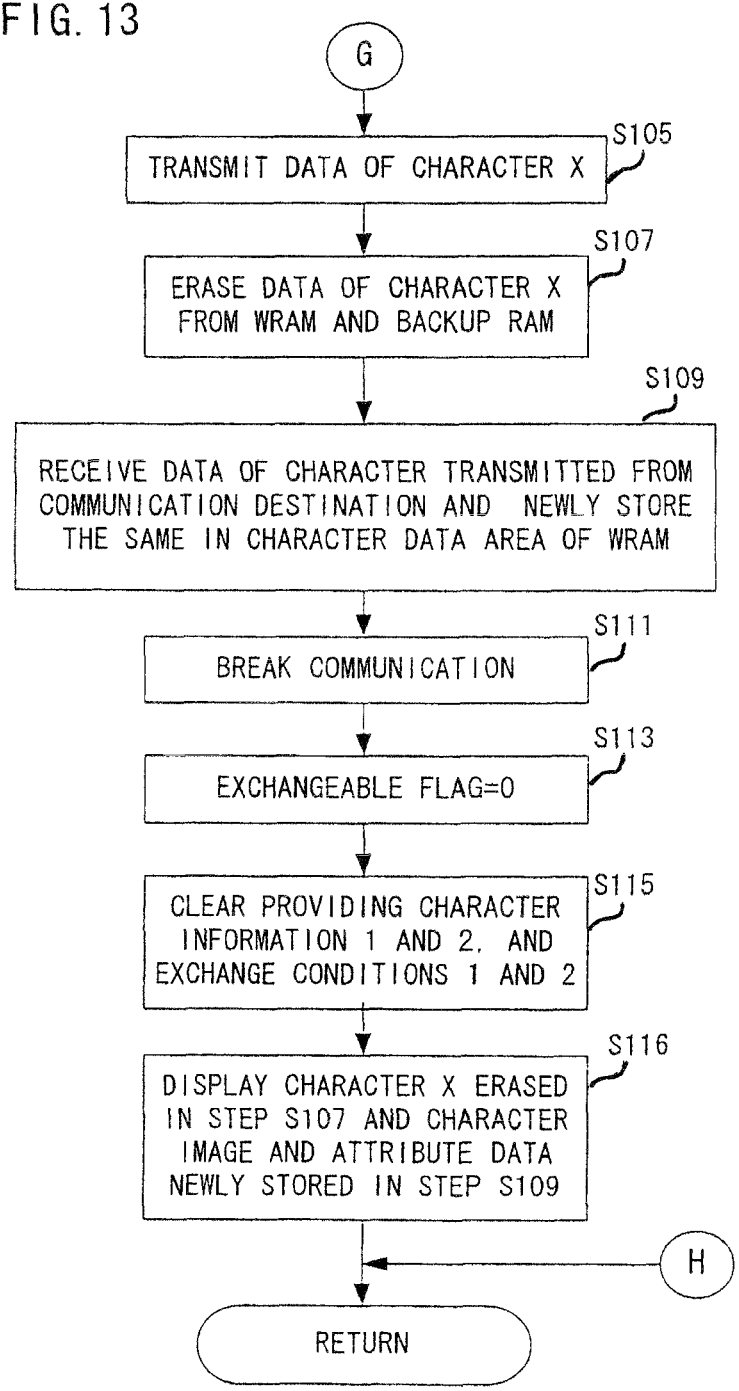
FIG. 13 is a flowchart showing another part of the character exchange process of the mobile game machine shown in FIG. 1.
Figure 14:
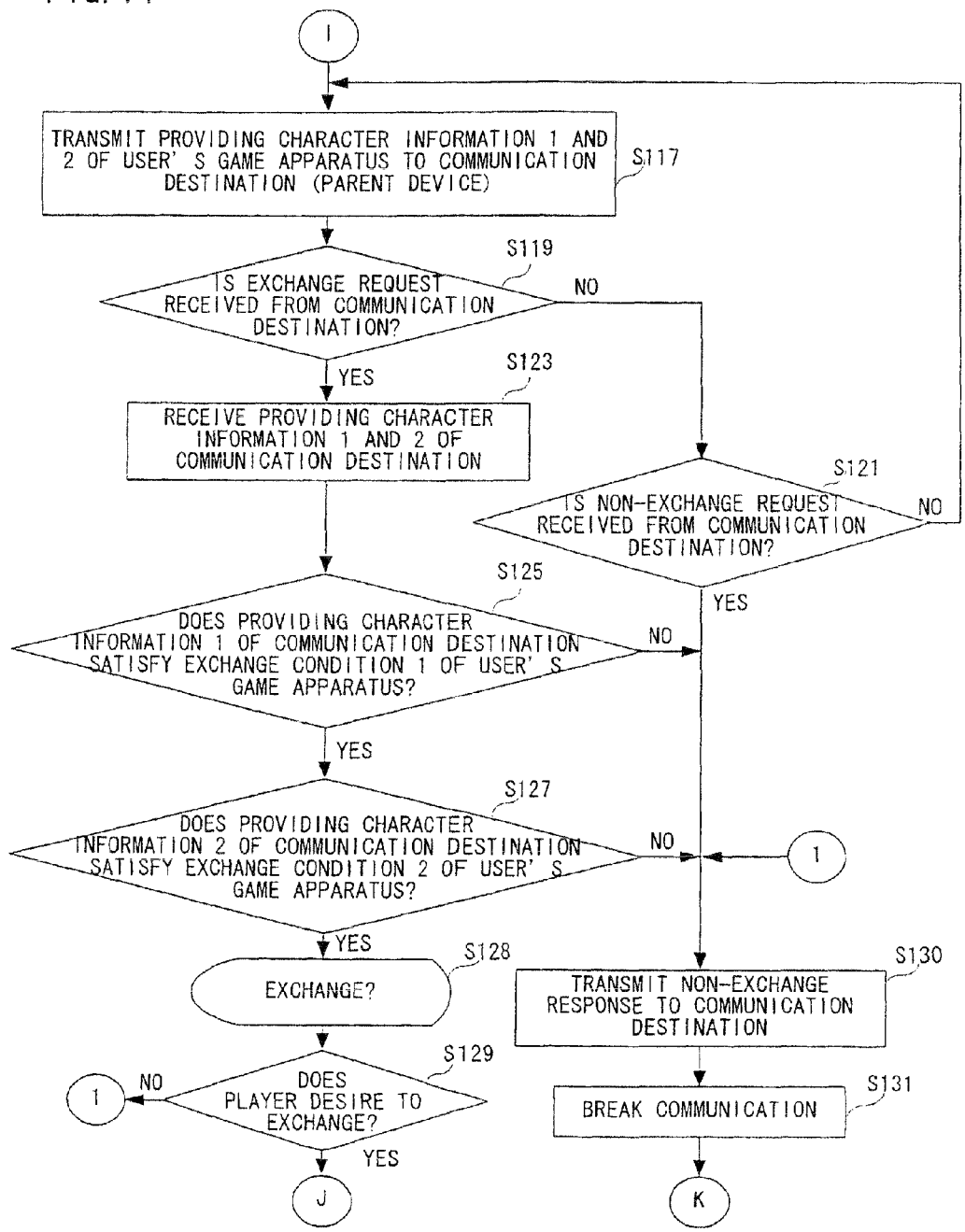
FIG. 14 is a flowchart showing the other part of the character exchange process of the mobile game machine shown in FIG. 1.

If "YES" in step S85, that is, if the user's mobile game apparatus is the child device, the process proceeds to step S117 shown in FIG. 14. On the other hand, if "NO" in step S85, that is, if the user's mobile game apparatus is not the child device, determining that another game apparatus does not exist within the communicable range or determining that the connection with another game apparatus fails, and then, the character exchange processing is returned as shown in FIG. 13.

Furthermore, if "YES" in step S83, that is, if the user's mobile game apparatus is the parent device, the providing character information 1 and providing character information 2 of the communication destination (child device) are received in step S87. Next, in step S89, it is determined whether or no the providing character information 1 of the communication destination satisfies the exchange condition 1 set in the user's mobile game apparatus.

If "NO" in step S89, that is, if the providing character information 1 of the communication destination does not satisfy the exchange condition set in the user's mobile game apparatus, a non-exchange request is transmitted to the communication destination in step S91, the communication is broken in step S93, and then, the character exchange processing is returned. On the other hand, if "YES" in step S89, that is, if the providing character information 1 of the communication destination satisfies exchange condition 1 set in the user's mobile game apparatus, it is determined whether or not the providing character information 2 of the communication destination satisfies the exchange condition 2 set in the user's mobile game apparatus in step S95.

If "NO" in step S95, that is, if the providing character information 2 of the communication destination does not satisfy the exchange condition 2 set in the user's mobile game apparatus, the process proceeds to step S91. On the other hand, if "YES" in step S95, that is, if the providing character information 2 of the communication destination satisfies the exchange condition 2 set in the user's mobile game apparatus, an exchange request is transmitted to the communication destination in step S97. Succeedingly, the providing character information 1 and the providing character information 2 set in the user's mobile game apparatus are transmitted to the communication destination in step S99.

Then, it is determined whether or not an exchange response from the communication destination is present in step S101. If "NO" in step S101, that is, if the exchange response is absent from the communication destination, it is determined whether or not a non-exchange response is present in step S103. If "NO" in step S103, that is, if the non-exchange response is absent from the communication destination, no response from the communication destination is determined, and then, the process directly returns to step S99 so as to once again transmit the providing character information 1 and providing character information 2 set in the user's mobile game apparatus. On the other hand, if "YES" in step S103, that is, if the non-exchange response is present from the communication destination, the process proceeds to step S93.

It is noted that it is possible that the player is inquired (confirmed) whether or not to perform the exchange similarly to steps S128 and S129 (see FIG. 14) described later successive to step S101.

Furthermore, if "YES" in step S101, that is, if the exchange response is present from the communication destination, the data (character information data stored in the WRAM 28) of the character X (which is selected as the providing character in the above-described process in steps S45 to S57) is transmitted in step S105 shown in FIG. 13, and the data is erased from each of the WRAM 28 and the backup RAM 44 in step S107. Next, in step S109, the data of the character, i.e., the character information data to be transmitted from the communication destination is received, and newly recorded (registered) in character data area 284 of WRAM 28. It is noted that the character information data is newly recorded in the backup RAM 44 at a time of being saved as shown in steps S39 and S41 in FIG. 9. Thus, the exchange of the characters in a case that the user's mobile game apparatus is the parent device is executed.

Thereafter, the communication is broken in step S111, the exchangeable flag is turned off (set to 0) in step S113, and then, the providing character information 1 and the providing character information 2, exchange condition 1, and exchange condition 2 are cleared in step S115. Then, in step S116, an image and attribute data (character name, level, and so on) of the character X erased in step S107 and a message indicative of character X being erased are displayed, and an image and attribute data (character name, level, and so on) of the character newly stored in step S109 and a message indicative of the character being newly obtained are displayed, and then, the character exchange processing is returned.

Furthermore, as described above, if it is determined that the user's mobile game apparatus is the child device in step S85, the providing character information 1 and providing character information 2 set in the user's mobile game apparatus are transmitted to the communication destination (parent device) in step S117 shown in FIG. 14. Next, it is determined whether or not the exchange request is received from the communication destination in step S119.

Figure 15:
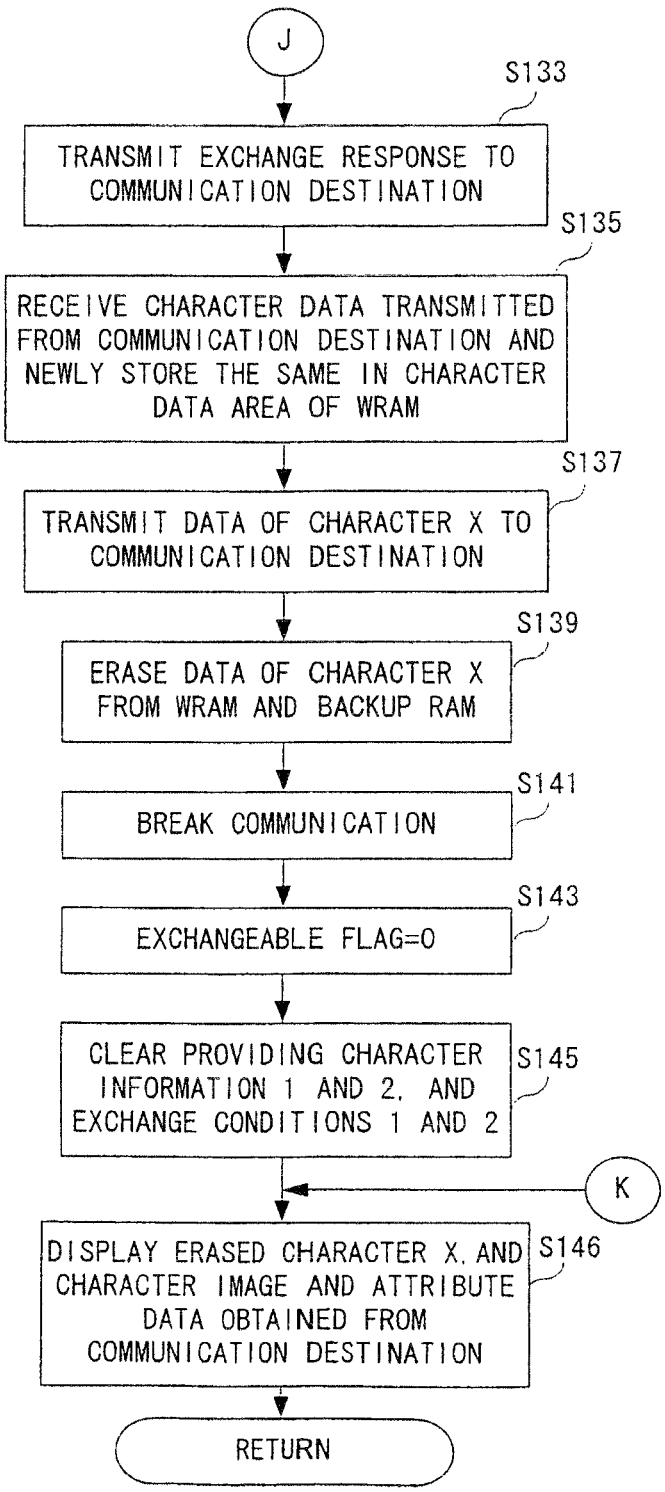
FIG. 15 is a flowchart showing a further part of the character exchange process of the mobile game machine shown in FIG. 1.

If "NO" in step S119, that is, if the exchange request is not received from the communication destination, it is determined whether or not the non-exchange request is received from the communication destination in step S121. If "NO" in step S121, that is, if the non-exchange request is not received from the communication destination, no response from the communication destination is determined, and then, the process directly returns to step S117 so as to once again transmit the providing character information 1 and providing character information 2 set in the user's game apparatus. On the other hand, if "YES" in step S121, that is, if the non-exchange request is received from the communication destination, the communication is broken in step S131, and then, the character exchange processing is returned as shown in FIG. 15.

If "YES" in step S119, that is, if the exchange request is received from the communication destination, the providing character information 1 and providing character information 2 of the communication destination are received in step S123, and it is determined whether or not the providing character information 1 of the communication destination satisfies the exchange condition 1 set in the user's mobile game apparatus in step S125. If "NO" in step S125, that is, if the providing character information 1 of the communication destination does not satisfy exchange condition 1 set in the user's game apparatus, the non-exchange response is transmitted to the communication destination in step S130, and then, the communication is broken in step S131, returning to the character exchange processing.

However, if "YES" in step S125, that is, if the providing character information 1 of the communication destination satisfies exchange condition 1 set in the user's mobile game apparatus, it is determined whether or not the providing character information 2 of the communication destination satisfies the exchange condition 2 set in the user's mobile game apparatus in step S127. If "NO" in step S127, that is, if the providing character information 2 of the communication destination does not satisfy exchange condition 2 set in the user's game apparatus, the process proceeds to step S130.

On the other hand, if "YES" in step S127, that is, if the providing character information 2 of the communication destination satisfies exchange condition 2 set in the user's mobile game apparatus, the player is inquired (confirmed) whether or not to perform exchange in step S128. More specifically, the information (kind, level, and so on) of the providing character of his own (character to be lost by the exchange) and the information (kind, level, and so on) of the providing character of the communication destination (character to be obtained by the exchange), and a user name (based on UserName included in the parent packet and the child packet) of the communication destination (the person with whom the exchange is performed) are displayed on the LCD 18, so that the player is asked whether or not to perform the exchange.

Then, it is determined whether or not the player desires to exchange in step S129. When it is determined the player desires to exchange in step S129 (it is determined that desiring the exchange is selected by an input of operation switch 38), "YES" is regarded, the exchange response is transmitted to the communication destination in step S133 shown in FIG. 15, and the data of the character, i.e., the character information data to be transmitted from the communication destination is received and newly stored (registered) in the character data area 284 of the WRAM 28 in step S135. It is noted that the character information data is newly registered in the backup RAM 44 at a time of being saved in the same manner as the above-described case. When it is determined that the player does not desire to exchange in step S129, "NO" is regarded, and then, the process proceeds to step S130.

Succeedingly, the data of character X, i.e., character information data of the character X is transmitted to the communication destination in step S137, and the data of the character X (character information data) is erased from each of the WRAM 28 and the backup RAM 44 in step S139. Thus, the exchange of the characters in a case that the user's mobile apparatus is the child device is executed. Then, the communication is broken in step S141, the exchangeable flag is turned off (set to 0) in step S143, the providing character information 1 and the providing character information 2, exchange condition 1, and exchange condition 2 are cleared in step S145, and then, the character exchange processing is returned. Then, in step S146, an image and attribute data (name and level of the character, and so on) of the character X newly stored in step S135, and a message indicative of the character being newly obtained are displayed, and an image and attribute data (name and level of the character, and so on) of character X erased in step S139, and a message indicative of the character X being erased are displayed, and then, the character exchange processing is returned.

It is noted that as described above, by transmitting to the mobile game apparatus of the communication destination the providing character information 1 and the providing character information 2, the mobile game apparatus of the communication destination that has received it determines whether or not exchange condition 1 and exchange condition 2 of its own are satisfied in this embodiment. However, by transmitting exchange condition 1 and exchange condition 2 to the mobile game apparatus of the communication destination, the mobile game apparatus of the communication destination that has received it may determine whether or not the providing character information 1 and providing character information 2 of its own are satisfied.

Furthermore, by transmitting to the mobile game apparatus of the communication destination all of the providing character information 1, the providing character information 2, exchange condition 1, and exchange condition 2, the mobile game apparatus of the communication destination which has received it may determine whether or not the providing information of the other party satisfies the exchange condition of its own, and whether or not the providing information of its own satisfies the exchange condition of the other party.

Next, referring to FIGS. 16 to 20, a description of step S81, the communication destination searching and connecting process is made. In this process, the mobile game apparatus 10 operates so as to establish a connection with another game apparatus as the parent device or the child device. In a case of attempting to establish a connection as the parent device, the mobile game apparatus 10 broadcasts broadcasting data including data indicative of being connectable so as to search another mobile game apparatus that exists within the communicationable range 64. If a connecting request is present from another mobile game apparatus that has received the broadcasting data as the child device, the mobile game apparatus 10 can establish a connection with the child device as the parent device.

On the other hand, in a case of attempting to establish a connection with another game apparatus as the child device, the mobile game apparatus 10 waits for a receiving of the broadcasting data from the parent device. Then, when receiving the broadcasting data from the parent device, by transmitting the connection request to the parent device in response thereto, a connection can be established with the parent device.

In such the communication destination searching and connecting process, each mobile game apparatus 10 alternately repeats a processing of functioning as the parent device so as to search the child device and a processing of functioning as the child device so as to receive a search from the parent device. More specifically, a predetermined period (T cycle in FIG. 16) is rendered one cycle, one part of each cycle is a period (Tsp in FIG. 16) during which the mobile game apparatus functions as the parent device, and the rest of the each cycle is a period (Tsc in FIG. 16) during which the mobile game apparatus functions as the child device. Herein, a connection can be established between the game apparatus functioning as the parent device and the game apparatus functioning as the child device while a connection cannot be established between the game apparatus functioning as the parent device and the game apparatus functioning as the parent device, and between the game apparatus functioning as the child device and the game apparatus functioning as the child device. Therefore, in a case that a period during which the mobile game apparatus functions as the parent device and a period during which the mobile game apparatus functions as the child device are fixed, it becomes impossible to establish a connection between the two game apparatuses accidentally having the coincident periods with each other. To prevent such a problem, an allocation or an arrangement of the periods during which the mobile game apparatus functions as the parent device and during which the mobile game apparatus functions as the child device per one cycle is changed at random. A method for changing the allocation at random is a "communication destination searching and connecting process (1)" as shown in FIG. 16 (A), and a method for changing the arrangement at random is a "communication destination searching and connecting process (2)" as shown in FIG. 16 (B).

Referring to FIG. 16 (A), in the communication destination searching and connecting process (1), the allocation of the Tsp and the Tsc is determined at random described above. Rendering the period (one cycle) of the processing a fixed value of Tcycle (e.g., four seconds), the length of the Tsc is determined to be a random value from 0 to Tcycle, and the length of the Tsp is determined to be the rest of the period of the Tcycle (Tcycle−Tsc). Furthermore, the Tsc and the Tsp are set in this order during the Tcycle. The length of the Tsc is determined at random every time, and therefore, the length of the Tsp is also determined at random. Thus, it is possible to avoid a case that the mobile game apparatus cannot establish the connection with another mobile game apparatus that exists within the communicationable range 64. It is noted that excessive shortness of the Tsp prevents the mobile game apparatus from accurately searching another mobile game apparatus, and may disable an establishment of the connection with another game apparatus. Therefore, the required minimum period with respect to the Tsp is determined, and if it is impossible to secure the same, the Tsc may be once again determined.

It is noted that although the Tsc and the Tsp are set in this order during the Tcycle in this embodiment, this is settable in the reverse order thereto.

Referring to FIG. 16 (B), in the communication destination searching and connecting process (2), the arrangement of the Tsp and the Tsc is determined at random as described above. That is, rendering the length of the Tsp a fixed value, a starting position of the Tsp within the Tcycle is set at random. More specifically, as shown in FIG. 16 (B), in the communication destination searching and connecting process (2), the T cycle (fixed value, i.e., four seconds in this embodiment) is provided with Tsp determined to be the fixed value, and Tsc1 and Tsc2 that are determined at random so as to sandwich the Tsp between them. That is, within the Tcycle, the Tsc1, the Tsp and the Tsc2 are provided in this order. Furthermore, the length of the Tsc1 is determined at random from 0 to (Tcycle−Tsp), and the length of the Tsc2 is determined by subtracting from the Tcycle the Tsc1 that is determined at random and the Tsp.

It is noted that the Tsc and the Tsp are set within the Tcycle in this order in this embodiment, and the starting position of the Tsp is determined at random, while in a case that the Tsp and the Tsc are set within the Tcycle in this order, the starting position of the Tsc may be determined at random.

FIG. 17 (A) is an illustrative view showing in detail a parent device packet broadcasted from the parent device to the child device. The parent device packet has a field sync for storing synchronizing data at its head, and has a field PID for storing an identifying number PID of the game apparatus (parent device) subsequent to that synchronizing data field sync. Subsequent to the field PID, a user name field UserName is formed. In the user name field UserName, a user name (player name) read-out from the EEPROM 54 (FIG. 1), which corresponds to "Taro", "Ichiro", etc. in this embodiment, is registered.

The parent packet successively includes fields Eflag, GameName, and Payload subsequent to the user name field UserName. The Eflag is data indicative of being connectable with another mobile game apparatus (child device), and is a flag that is turned on when searching another mobile game apparatus (child device) as the parent device, and is turned off during being connected with another mobile game apparatus (child device). The GameName is, as described above, the identifying information of the game program stored in the ROM 42 of the cartridge 16 connected to the game apparatus of the parent device.

In a Payload field Payload, substantive transmission data from the parent device to the child device is stored. More specifically, this is a field for transmitting a connection response transmitted from the parent device to the child device, the data of the providing character information 1 and data of the providing character information 2 required at a time of the game data exchange processing, and transmitting the game data required for the communication game, or the game data (character information data) to be exchanged, and a field for storing data to be transmitted from the parent device to the child device.

FIG. 17 (B) is an illustrative view showing in detail a child device packet to be transmitted from the child device to the parent device. The child device packet includes a head field CID for storing an identifying number of the game apparatus (child device), a user name field UserName, and a payload field Payload subsequent thereto. The user name filed UserName is information of the user name (player name) of the child device similarly to the above description. The payload field Payload stores substantive transmission data from the child device to the parent device. More specifically, this is a field for storing a connection request transmitted from the child device to the parent device, the data of the providing character information 1 and data of the providing character information 2 to be transmitted from the child device to the parent device, or the game data. By communicating between the parent packet and the child packet, it is possible for the parent device and the child device to know each other's user names.

Each mobile game apparatus 10 alternately repeats a transmission of the parent packet and a receiving of the child packet when functioning as the parent device, and alternately repeats a receiving of the parent packet and a transmission of the child packet when functioning as the child device. In the communication destination searching and connecting process (1) and (2), during the TSP period, the mobile game apparatus 10 repeatedly performs a process of broadcasting the parent packet and then, attempting to receive the child packet (connection request) to be transmitted from another mobile game apparatus 10. Furthermore, during the TSC period, the mobile game apparatus 10 repeatedly performs a process of attempting to receive the parent packet transmitted from another game apparatus, and transmitting the child packet (connection request) when succeeding in the receiving.

In addition, the mobile game apparatus 10 is driven by a battery, and transmits broadcasting data for each predetermined time period (64 ms in this embodiment) during which it functions as the parent device in order to prevent waste of the battery. That is, a broadcast is intermittently executed.

It is noted that although omitted in the above-described character exchange processing (FIG. 12 to FIG. 15), the providing character information 1, the providing character information 2, and the game data (character information data) are stored in the payload field Payload of the parent device packet or the child device packet so as to be exchanged between the parent device and the child device.

A description is made on each of the communication destination searching and connecting process (1) and the communication destination searching and connecting process (2) by use of the flowcharts in detail.

Figure 18:
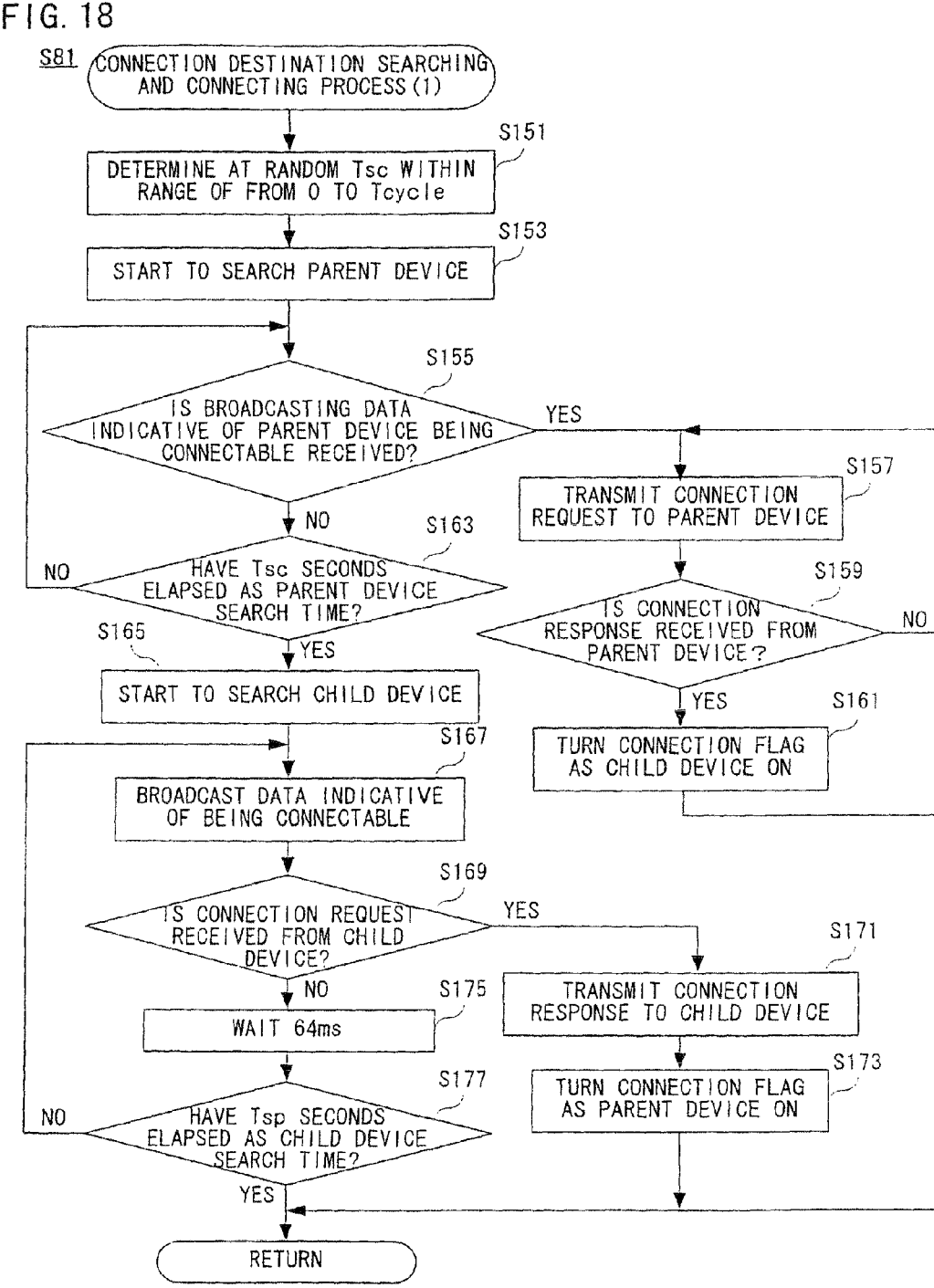
FIG. 18 is a flowchart showing a communication destination searching and connecting process (1) of the mobile game machine shown in FIG. 1.

FIG. 18 is a flowchart showing the communication destination searching and connecting process (1). Referring to FIG. 18, when starting the communication destination searching and connecting process (1), the Tsc is determined at random within a range of from 0 to the Tcycle in step S151. Although not illustrated, the Tcycle is a fixed value, and a determination of the Tsc causes a determination of the Tsp.

In following steps S153 to S163, a processing to be executed in the above-described Tsc period for searching the parent device by functioning as the child device is performed. In steps S165 to S177, a processing to be executed in the above-described Tsp period for searching the child device by functioning as the parent device is performed.

In step S153, a search of the parent device is started. Although not illustrated, a timer circuit is started at this time. Next, it is determined whether or not the broadcasting data (data indicative of the Eflag being turned on) indicative of the parent device being connectable is received in step S155.

If "YES" in step S155, that is, if the broadcasting data indicative of the parent device being connectable (parent device packet) is received, a connection request (child device packet) is transmitted to the parent device in step S157, and then, it is determined whether or not the connection response from the parent device is received in step S159. If "NO" in step S159, that is, if the connection response is not received from the parent device, the process directly returns to step S157. On the other hand, if "YES" in step S159, that is, if the connection response from the parent device is received, determining that a connection is established with another mobile game apparatus as the child device, the child device flag is turned on in step S161, and then, the communication destination searching and connecting process (1) is returned.

It is noted that although omitted in FIG. 18, when the communication destination searching and connecting process (1) is started, the child device flag is turned off (reset) (the same is applied to the parent device to be described later).

On the other hand, if "NO" in step S155, that is, if no broadcasting data from the parent device is received, or if the broadcasting data from the parent device is received, but the broadcasting data is not indicative of being connectable (Eflag is turned off), it is determined whether or not Tsc seconds have elapsed as a parent device searching time period, that is, a period for attempting to connect as the child device to another mobile game apparatus in step S163.

It is noted that it is determined whether or not the Game-Name of the broadcasting data of the parent device is coincident with the GameName stored in the ROM 42 of the cartridge 16 attached to the child device in step S155, and if they are not coincident with each other also, the process proceeds to step S163. This is true for a communication destination searching and connecting process (2) described later in steps S185 and S211 (see FIG. 19 and FIG. 20).

If "NO" in step S163, that is, if the Tsc seconds have not elapsed as the parent device searching time period, the process directly returns to step S155. On the other hand, if "YES" in step S163, that is, if the Tsc seconds have elapsed as the parent device searching time period, a search of the child device is started in step S165, that is, the timer circuit is reset and started, and the data indicative of being connectable (parent device packet in which Eflag is turned on) is broadcasted in step S167.

Next, in step S169, it is determined whether or not a connection request from the child device (child device packet) is received. If "YES" in step S169, that is, if the connection request from the child device is received, the connection response is transmitted to the child device in step S171, the parent device flag is turned on in step S173, and then, the communication destination searching and connecting process (1) is returned. That is, the connection between another mobile game apparatus is established as the parent device.

On the other hand, if "NO" in step S169, that is, if the connection request from the child device is not received, 64 ms is waited in step S175, and in step S177, it is determined whether or not Tsp seconds have elapsed as a child device searching time period, that is, a period for attempting to connect as the parent device to another mobile game apparatus. If "NO" in step S177, that is, if the Tsp seconds have not elapsed as the child device searching time period, the process directly returns to step S167. On the other hand, if "YES" in step S177, that is, if the Tsp seconds have elapsed as the child device searching time period, it is determined that the Tcycle period has elapsed, the communication destination searching and connecting process (1) is returned. Waiting 64 ms in step S175 enables an intermittent broadcasting transmission processing in step S167, and then, it becomes possible to lower power consumption.

Figure 19:
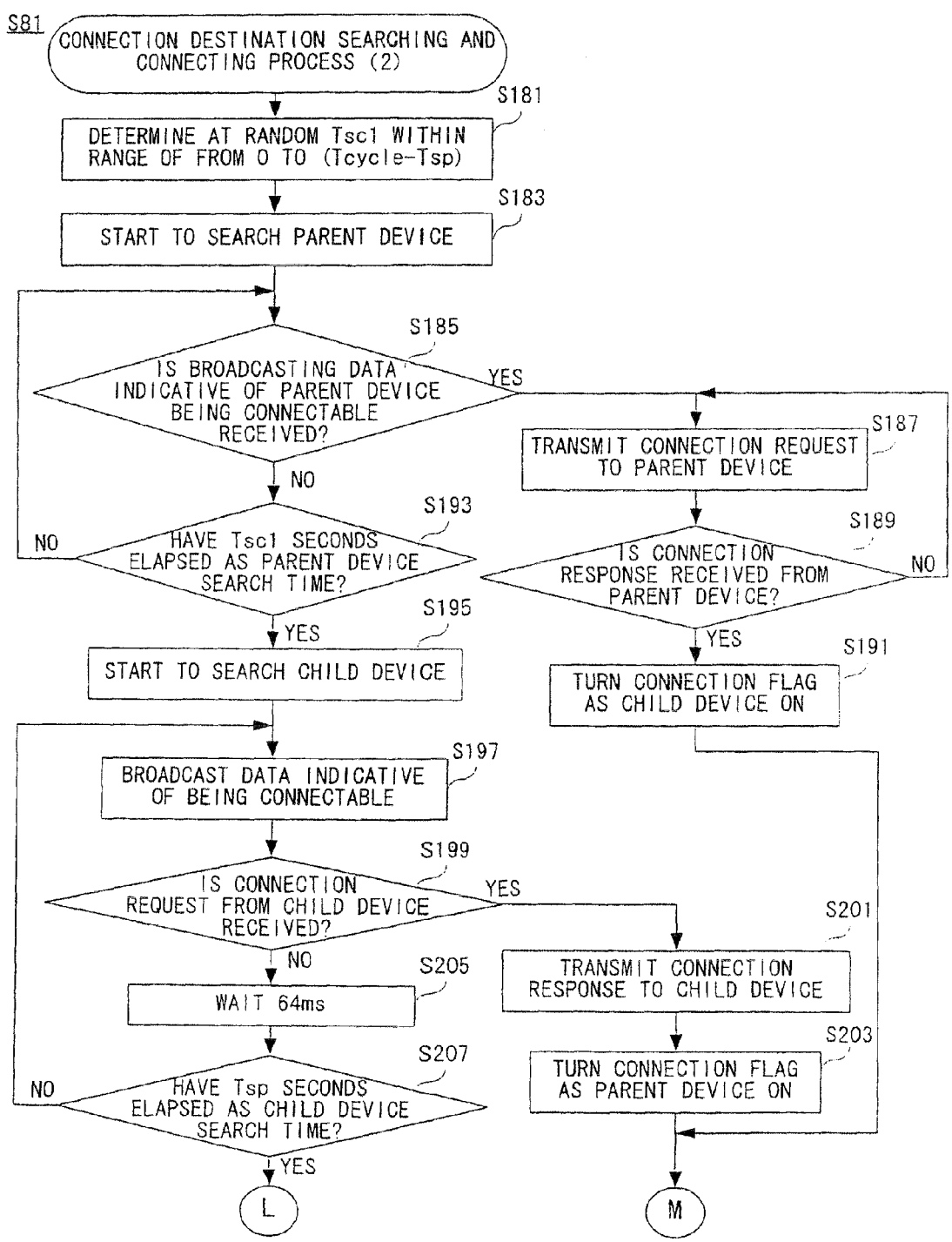
FIG. 19 is a flowchart showing a part of a communication destination searching and connecting process (2) of the mobile game machine shown in FIG. 1.
Figure 20:
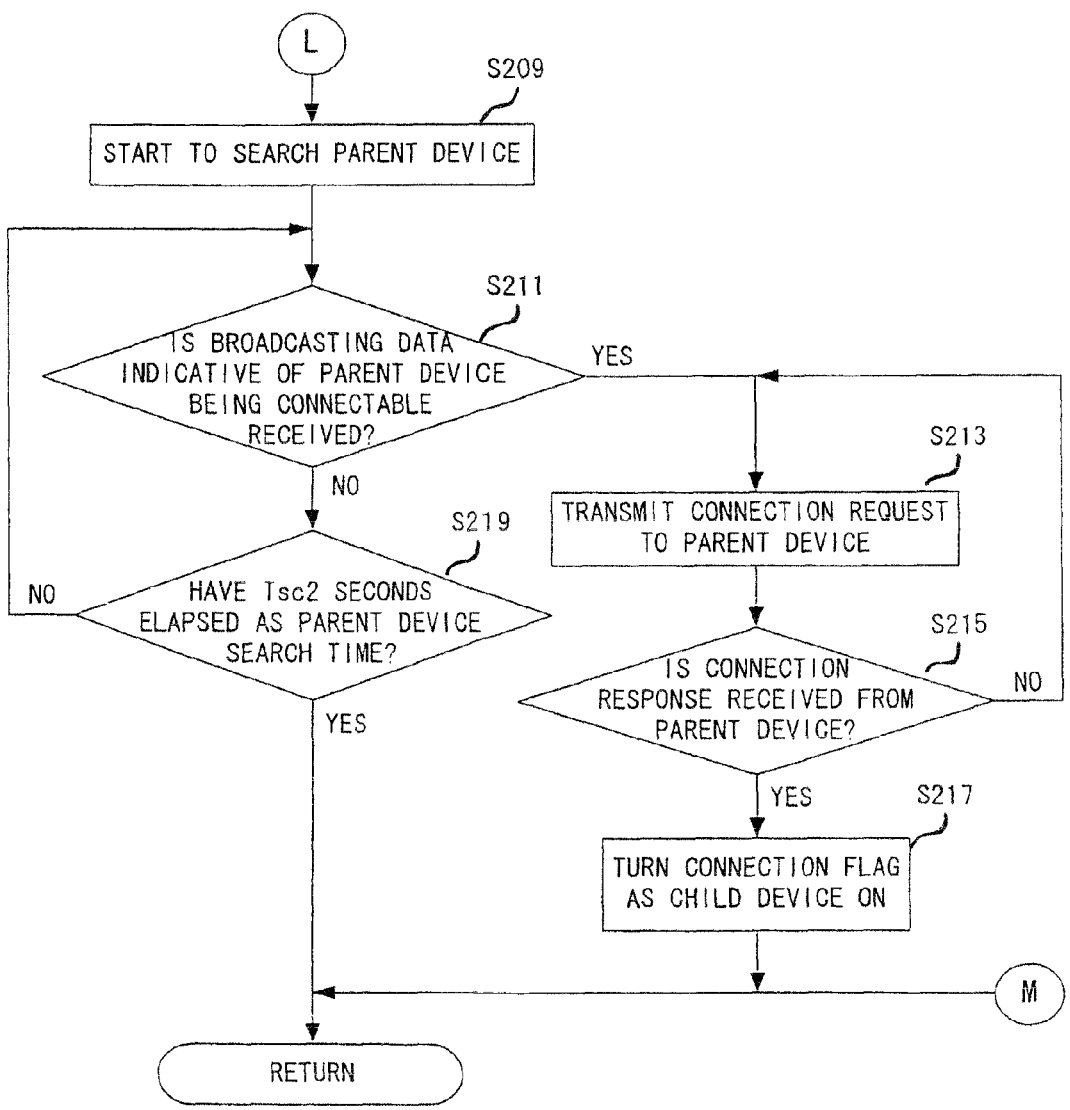
FIG. 20 is a flowchart showing another part of the communication destination searching and connecting process (2) of the mobile game machine shown in FIG. 1.

FIG. 19 and FIG. 20 are flowcharts showing the communication destination searching and connecting process (2). Referring to FIG. 19, when starting the communication destination searching and connecting process (2), the Tsc1 is determined at random within a range of from 0 to (Tcycle−Tsp) in step S181. As described above, the Tcycle and the Tsp are fixed values, and a determination of the Tsc1 causes a determination of the Tsc2.

In following steps S183 to S193, a processing to be executed in the above-described Tsc1 period for searching the parent device by functioning as the child device is performed. In steps S195 to S207, a processing to be executed in the above-described Tsp period for searching the child device by functioning as the parent device is performed. Furthermore, in steps S209 to S219, a processing to be executed in the above-described Tsc2 period for searching the parent device by functioning as the child device is performed.

In step S183, a search of the parent device is started. Although not illustrated, the timer circuit is started at this time. Next, in step S185, it is determined whether the broadcasting data indicative of the parent device being connectable is received or not.

If "YES" in step S185, that is, if the broadcasting data indicative of the parent device being connectable is received, a connection request is transmitted to the parent device in step S187, and then, it is determined whether or not the connection response from the parent device is received in step S189. If "NO" in step S189, that is, if the connection response from the parent device is not received, the process directly returns to step S187. On the other hand, if "YES" in step S189, that is, if the connection response from the parent device is received, determining that a connection is established as the child device with another mobile game apparatus, the child device flag is turned on in step S191, and then, the communication destination searching and connecting process (2) is returned as shown in FIG. 20.

It is noted that although omitted in FIG. 19, the child device flag and the parent device flag are turned off when starting the communication destination searching and connecting process (2) similarly to the communication destination searching and connecting process (1).

On the other hand, if "NO" in step S185, that is, if no broadcasting data from the parent device is received, or if the broadcasting data from the parent device is received, but the broadcasting data is not indicative of being connectable (Eflag is turned off), it is determined whether or not Tsc1 seconds have elapsed as a parent device searching time period, that is, a period for attempting to connect as the child device to another mobile game apparatus in step S193. If "NO" in step S193, that is, if the Ts1 seconds have not elapsed as a parent device searching time period, the process directly returns to step S185. On the other hand, if "YES" in step S193, that is, if the Ts1 seconds have elapsed as the parent device searching time period, a search of the child device is started in step S195, that is, the timer circuit is reset and started, and the data indicative of being connectable is broadcasted in step S197.

Next, in step S199, it is determined whether or not the connection request from the child device is received. If "YES" in step S199, that is, if the connection request is received from the child device, the connection response is transmitted to the child device in step S201, the parent device flag is turned on in step S203, and then, the communication destination searching and connecting process (2) is returned. That is, the connection with another mobile game apparatus is established as the parent device.

On the other hand, if "NO" in step S199, that is, if the connection request from the child device is not received, 64 ms is waited in step S205, and in succeeding step S207, it is determined whether or not Tsp seconds have elapsed as the child device searching time period, that is, a period for attempting to connect as the parent device to another mobile game apparatus. If "NO" in step S207, that is, if the Tsp seconds have not elapsed as the child device searching time period, the process directly returns to step S197. On the other hand, if "YES" in step S207, that is, if the Tsp seconds for searching the child device have elapsed as the child device searching time period, a searching of the parent device is started in step S209 shown in FIG. 20. At this time, the timer circuit is reset and started.

Next, in step S211, it is determined whether or not the broadcasting data indicative of the parent device being connectable is received. If "YES" in step S211, that is, the broadcasting data indicative of the parent device being connectable is received, the connection request is transmitted to the parent device in step S213, and then, it is determined whether or not the connection response from the parent device is received in step S215. If "NO" in step S215, that is, if the connection response from the parent device is not received, the process directly returns to step S213. On the other hand, if "YES" in step S215, that is, if a connection response from the parent device is received, determining that a connection is established as the child device with another mobile game apparatus, the child device flag is turned on in step S217, and then, the communication destination searching and connecting process (2) is returned.

On the other hand, if "NO" in step S211, that is, if no broadcasting data is received from the parent device, or if the broadcasting data from the parent device is received, but the broadcasting data is not indicative of being connectable (Eflag is turned off), it is determined whether or not Tsc2 seconds have elapsed as the parent device searching time period in step S219. If "NO" in step S219, that is, if the Tsc2 seconds have not elapsed as the parent device searching time period, the process directly returns to step S211. On the other hand, if "YES" in step S219, that is, if the Tsc2 seconds have elapsed as the parent device searching time period, determining that the Tcycle period has elapsed, the communication destination searching and connecting process (2) is returned.

According to this embodiment, it is possible to automatically exchange characters having coincident exchange conditions by the radio communication, and therefore, this eliminates a trouble of negotiating with player's acquaintance for exchanging the characters, and so forth. That is, it is possible to exchange the game data with ease.

Furthermore, the person with whom the user exchanges the characters is not limited to his acquaintance, and therefore, if the player goes to wherever people gather, it is possible to increase the possibility of exchanging the characters, and hence, it is possible to improve an entertainment aspect of the game.

It is noted that although a description is only made on the game system utilizing the mobile game apparatus in this embodiment, it is possible to use a portable terminal such as a portable phone, a PDA, etc. having a game function in place of the mobile game apparatus.

Furthermore, one providing character and one exchange condition are set as the exchange condition to be set at a time in this embodiment. However, a plurality of providing character information are set at one time, and the exchange condition for each providing character information may be set. That is, a plurality of game data out of the game data possessed by the player himself are set as the providing game data, the exchange condition is set for each providing game data. This makes it possible to set a plurality of the exchange conditions at one time, to heighten the possibility of being coincident with another player's exchange condition, and heighten a possibility of executing the exchange of the game data.

In this case, assuming that a plurality of providing characters are respectively set to a game apparatus A and a game apparatus B, and the exchange condition is set for each providing character, for example. When characters are exchanged between the game apparatus A and the game apparatus B, a set of the exchange condition of the game apparatus A and the providing character of the game apparatus B that satisfies the condition is picked. Then, with respect to the set of the exchange condition of the game apparatus A (exchange condition a) and the providing character of the game apparatus B (providing character b) that have been picked, it is determined whether or not the providing character of the game apparatus A (providing character a) to which the exchange condition is set satisfies the exchange condition of the game apparatus B (exchange condition b) that is set against the providing character b, and if they are coincident with each other, the providing character a and the providing character b are exchanged.

In addition, although the kind and level of the character are designated as the providing character information and the exchange condition in this embodiment, there is no need to be limited thereto. That is, only the kind of the character may be designated, or the kind of the character is not designated but the level thereof may be designated. In addition, it is possible that the information to be designated is information except for the kind and level of the character.

Furthermore, in this embodiment, the parent device broadcasts predetermined information, then, establishes a connection with the child device that has received it, and then transmits and receives information for identifying the exchange condition. However, information for identifying the exchange condition (information (kind and level) of the providing character and information (kind and level) of the required character in the above-described embodiment) may be included in the broadcasting data to be transmitted from the parent device. Then, the child device that has received the broadcasting data applies a connection request to the parent device only when the information satisfies the information of the providing character and exchange condition of its own with referring to the information of the providing character and the required character, etc. included in the broadcasting data.

Still furthermore, it is appropriate that although the providing game data and the exchange condition are set when the progress of the game satisfies the predetermined condition on the basis of the exchange table in this embodiment, the player sets the providing game data and the exchange condition whenever he wants.

In addition, it is appropriate that although the character exchange processing (in S9 in FIG. 7) is executed parallel to the execution of the game processing (in S5 in FIG. 7) in this embodiment, only the character exchange processing is executed when the game processing is not performed. In this case, since the LCD 18 need not be displayed except for the process for confirming player's will to exchange and the process for displaying the information as to the exchanged game data when the exchange is performed, a power supply to the LCD 18 is shut off (a display of the LCD 18 is turned off by setting the value of the register to 0), and the CPU core 22 performs the character exchange processing. Then, it is appropriate that when the process for confirming the player's will to exchange is performed (in steps S128 and S129 in FIG. 14) and the process for displaying the information of the exchanged character (in step S116 in FIG. 13 and in step S146 in FIG. 15) are executed, by setting the value of the electric power supply register to 1, the power supply to the LCD 18 is performed to display the screen for confirming the exchange and the information of the exchanged character. This enables the player to continue to search a person who has a coincident exchange condition by executing the character exchange processing with the game apparatus in his bag, pocket, and so on while due to the display of the LCD 18 being tuned off, it is convenient for a power savings. It is appropriate that considering such a situation, when the display of the LCD 18 is turned on, by outputting a sound (music) from the game apparatus 10 or by vibrating the game apparatus 10 with a vibration function, the player is informed of the fact.

Furthermore, it is appropriate that even if a character is set to be the providing character, when the character is selected as a character to be used in the game processing (FIG. 8 and FIG. 9), the providing character needs not to be an exchangeable object. That is, with respect to the character selected by the player before the game as the character to be used in the game processing, even if the character is set to be the providing character, it is regarded that the character is not set to be the providing character in the character exchange processing (see FIG. 12 to FIG. 15), the character is eliminated from the processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game-playing device, comprising:
a communication unit for performing wireless radio communication, the communication unit being operable in a first mode for searching for another device, and a second mode for receiving a search from another device; and
a cycling unit cooperating with the communication unit for alternately repeating the first and second modes, at least one of the first and second modes being performable for a random length of time.

2. The device of claim 1, wherein at least one of the first and second modes is performable for a random length of time that varies periodically.

3. The device of claim 1, wherein at least one of the first and second modes is performable for a random length of time that varies with a predetermined cycle.

4. The device of claim 3, wherein at least one of the first and second modes is performable for a random length of time that varies with each repetition of the cycling unit.

5. The device of claim 1, wherein one of the first and second modes is performed for a fixed length of time and the other of the first and second modes is performed for a random length of time.

6. The device of claim 3, wherein one of the first and second modes is performed for a fixed length of time and the other of the first and second modes is performed for a random length of time.

7. The device of claim 6, wherein the second mode is performed for a random length of time.

8. The device of claim 7, wherein the random length of time varies for each repetition of the second mode.

9. A game-playing device, comprising:
a communication unit for performing wireless radio communication, the communication unit being operable in a first mode for searching for another device, and a second mode for receiving a search from another device; and
a cycling unit cooperating with the communication unit for alternately repeating the first and second modes, at least one of the first and second modes being performable at a random-based time.

10. The device of claim 9, wherein the first mode is performable at a random-based time and the second mode is performable at a random-based time.

11. The device of claim 9, wherein at least one of the first and second modes is performable for a random length of time that varies in different cycles.

12. The device of claim 9, wherein one of the first and second modes is performed for a fixed duration and the other of the first and second modes is performed for a random duration.

13. The device of claim 9, wherein one of the first and second modes is performed at a randomized time for a fixed duration and the other of the first and second modes is performed at a randomized time for a randomized duration.

14. The device of claim 9, wherein the first mode is performed at a randomized time for a fixed duration and the second mode is performed at a randomized time for a randomized duration.

15. The device of claim 1, wherein the random length of time exceeds a predetermined minimum duration.

16. The device of 1, wherein the random length of time does not exceed a predetermined maximum duration.

17. The device of claim 1, wherein randomness provided by the cycling unit as to the one of the first and second mode diversifies the timing of sending a search in the first mode with respect to the timing of awaiting a search in the second mode of another device as recited in claim 1.

18. The device of claim 1, wherein randomness provided by the cycling unit diversifies both the timing of sending a search and the timing of awaiting a search.

19. The device of claim 7, wherein randomness provided by the cycling unit as to the second mode diversifies at least the ending time of the second mode and the starting time of a next first mode.

20. The device of claim 1, wherein the second mode is performed immediately after the first mode and a next first mode is performed immediately after the second mode.

21. The device of claim 1, wherein the communication unit enables communication with another device in situations where (a) the device is operating in the second mode and receives a search from the another device, and the communication unit also enables communication with another device in situations where (b) the device is operating in the first mode and sends a search to the another device when the another device is awaiting a search.

22. The device of claim 1, wherein at least the second mode is performable for a random length of time, wherein randomness of the random length of time diversifies the timing of awaiting a search to increase the likelihood of receiving a search.

23. The device of claim 1, wherein at least the first mode is performable for a random length of time, wherein randomness of the random length of time diversifies the timing of sending a search to increase the likelihood of the search being received.

24. The device of claim 1, wherein the another device comprises another communication unit for performing wireless radio communication, the another communication unit being operable in a first mode for searching for the device, and a second mode for receiving a search from the device, and another cycling unit cooperating with the another communication unit for alternately repeating the first and second modes, at least one of the first and second modes being performable for another random length of time; and wherein:

the communication unit performing in the first mode of the device sends a search for the another communication unit of the another device and the another communication unit performing in the second mode of the another device receives the search, wherein the another communication unit performing in the first mode of the another device sends a search for the communication unit of the device and the communication unit performing in the second mode of the device receives the search, and whereby randomness increases the likelihood that the another communication unit of the another device receives the search sent by the communication unit of the device and the likelihood that the communication unit of the device receives the search sent by the another communication unit of the another device.

25. The device of claim 24, wherein the random length of time varies at least some cycles, exceeds a predetermined minimum duration and does not exceed a predetermined maximum duration, and is set independently of other devices.

26. The device of claim 25, wherein one of the first and second modes is performed for a fixed duration and the other of the first and second modes is performed for a random duration.

27. The device of claim 26, wherein the second mode is performed for a random duration.

28. The device of claim 1, wherein the another device comprises another communication unit for performing wireless radio communication, the another communication unit being operable in a first mode for searching for the device, and a second mode for receiving a search from the device, and another cycling unit cooperating with the another communication unit for alternately repeating the first and second modes, at least one of the first and second modes being performable for another random length of time,
wherein the random length of time and the another random length of time are set independently of one another.

29. The device of claim 1, further comprising a responding unit cooperating with the communication unit in the second mode for sending responding data, in response to receiving a search, to another device that sent the search.

30. The device of claim 29, wherein the responding unit sends the responding data automatically.

31. The device of claim 29, the responding unit sends the responding data automatically if the search satisfies a predetermined condition.

32. The device of claim 29, further comprising a receiving unit cooperating with the communication unit in the first mode for receiving responding data from another device in response to the device's own search.

33. The device of claim 29, further comprising:
a first connection unit for, after receiving a search via the communication unit in the second mode, executing a first connection process with another device that sent the search; and
a second connection unit for, after receiving responding data via the receiving unit, executing a second connection process with another device that sent the responding data.

34. The device of claim 1, wherein the device is handheld.

35. A device configured to play a game, comprising:
a communication unit for performing wireless radio communication, the communication unit being operable in a first mode and a second mode, the communication unit in the first mode searching other devices in the second mode, the communication unit in the second mode searching other devices in the first mode; and
a cycling unit cooperating with the communication unit for alternately repeating the first and second modes, at least one of the first and second modes being performable for a random length of time.

36. A system comprising a plurality of devices configured to play a game,
the plurality of devices each comprising:
a communication unit for performing wireless radio communication, the communication unit being alternately operable in a first mode for searching for another device, and a second mode for receiving a search from another device; and
a cycling unit cooperating with the communication unit for alternately repeating the first and second modes, at least one of the first and second modes being performable for a random length of time;
wherein the respective communication units performing in respective first mode, send searches for unspecified devices;
wherein a respective communication unit, performing in its respective second mode, receives searches.

37. A device configured to play a game and usable in the system of claim 36.

38. A system comprising first and second devices configured to play a game, the first device comprising:
a communication unit for performing wireless radio communication, the communication unit being operable in a first mode for searching for another device, and a second mode for receiving a search from another device; and
a cycling unit cooperating with the communication unit for alternately repeating the first and second modes, at least one of the first and second modes being performable for a random length of time.

39. The system of claim 38, wherein at least one of the first and second modes is performable for a random length of time that varies periodically.

40. The system of claim 38, wherein at least one of the first and second modes is performable for a random length of time that varies with a predetermined cycle.

41. The system of claim 40, wherein at least one of the first and second modes is performable for a random length of time that varies with each repetition of the cycling unit.

42. The system device of claim 38, wherein one of the first and second modes is performed for a fixed length of time and the other of the first and second modes is performed for a random length of time.

43. The system of claim 40, wherein one of the first and second modes is performed for a fixed length of time and the other of the first and second modes is performed for a random length of time.

44. The system of claim 43, wherein the second mode is performed for a random length of time.

45. The system of claim 44, wherein the random length of time varies for each repetition of the second mode.

46. A system comprising first and second devices configured to play a game, the first device comprising:
a communication unit for performing wireless radio communication, the communication unit being operable in a first mode for searching for another device, and a second mode for receiving a search from another device; and
a cycling unit cooperating with the communication unit for alternately repeating the first and second modes, at least one of the first and second modes being performable at a random-based time.

47. The system of claim 46, wherein at least one of the first and second modes is performable for a random length of time that varies in different cycles.

48. The system of claim 46, wherein one of the first and second modes is performed for a fixed duration and the other of the first and second modes is performed for a random duration.

49. The system of claim 46, wherein one of the first and second modes is performed at a randomized time for a fixed duration and the other of the first and second modes is performed at a randomized time for a randomized duration.

50. The system of claim 46, wherein the first mode is performed at a randomized time for a fixed duration and the second mode is performed at a randomized time for a randomized duration.

51. The system of claim 38, further comprising a responding unit cooperating with the communication unit in the second mode for sending responding data, in response to receiving a search, to another device that sent the search.

52. The system of claim 38, wherein the another device comprises another communication unit for performing wireless radio communication, the another communication unit being operable in a first mode for searching for the first device, and a second mode for receiving a search from the first device, and another cycling unit cooperating with the another communication unit for alternately repeating the first and second modes, at least one of the first and second modes being performable for another random length of time,
wherein the random length of time and the another random length of time are set independently of one another, and
further comprising a receiving unit cooperating with the communication unit in the first mode for receiving responding data from another device in response to the first device's own search.

53. The system of claim 51, further comprising:
a first connection unit for, after receiving a search via the communication unit in the second mode, executing a first connection process with another device that sent the search; and
a second connection unit for, after receiving responding data via the receiving unit, executing a second connection process with another device that sent the responding data.

54. A system comprising first and second game-playing devices, the first device comprising:
a communication unit for performing wireless radio communication, the communication unit being operable in a first mode and a second mode, the communication unit in the first mode searching other devices in the second mode, the communication unit in the second mode searching other devices in the first mode; and
a cycling unit cooperating with the communication unit for alternately repeating the first and second modes, at least one of the first and second modes being performable for a random length of time.

55. A non-transitory computer readable storage medium tangibly storing a program executable on a game-playing device comprising at least one processor and a communication unit for performing wireless radio communication, the program comprising instructions configured to at least:
cause the communication unit to operate in a first mode for searching for another device;
cause the communication unit to operate in a second mode for receiving a search from another device; and
cycle the communication unit so that the communication unit alternately repeats the first and second modes, at least one of the first and second modes being performable for a random length of time.

56. The non-transitory computer readable storage medium of claim 55, wherein at least one of the first and second modes is performable for a random length of time that varies periodically.

57. The non-transitory computer readable storage medium of claim 55, wherein at least one of the first and second modes is performable for a random length of time that varies with a predetermined cycle.

58. The non-transitory computer readable storage medium of claim 57, wherein at least one of the first and second modes is performable for a random length of time that varies with each repetition.

59. The non-transitory computer readable storage medium of claim 55, wherein one of the first and second modes is performed for a fixed length of time and the other of the first and second modes is performed for a random length of time.

60. The non-transitory computer readable storage medium of claim 57, wherein one of the first and second modes is performed for a fixed length of time and the other of the first and second modes is performed for a random length of time.

61. The non-transitory computer readable storage medium of claim 60, wherein the second mode is performed for a random length of time.

62. The non-transitory computer readable storage medium of claim 61, wherein the random length of time varies for each repetition of the second mode.

63. A non-transitory computer readable storage medium tangibly storing a program executable on a game-playing device comprising at least one processor and a communication unit for performing wireless radio communication, the program comprising instructions configured to at least:
cause the communication unit to operate in a first mode for searching for another device;
cause the communication unit to operate in a second mode for receiving a search from another device; and
cycle the communication unit so that the communication unit alternately repeats the first and second modes, at least one of the first and second modes being performable at a random-based time.

64. The non-transitory computer readable storage medium of claim 63, wherein at least one of the first and second modes is performable for a random length of time that varies in different cycles.

65. The non-transitory computer readable storage medium of claim 63, wherein one of the first and second modes is performed for a fixed duration and the other of the first and second modes is performed for a random duration.

66. The non-transitory computer readable storage medium of claim 63, wherein one of the first and second modes is performed at a randomized time for a fixed duration and the other of the first and second modes is performed at a randomized time for a randomized duration.

67. The non-transitory computer readable storage medium of claim 63, wherein the first mode is performed at a randomized time for a fixed duration and the second mode is performed at a randomized time for a randomized duration.

68. The non-transitory computer readable storage medium of claim 55, wherein the program further comprises instructions to at least cooperate with the communication unit in the second mode for sending responding data, in response to receiving a search, to another device that sent the search.

69. The non-transitory computer readable storage medium of claim 55, wherein the another device comprises another communication unit for performing wireless radio communication, the another communication unit being operable in a first mode for searching for the device, and a second mode for receiving a search from the device, and another cycling unit cooperating with the another communication unit for alternately repeating the first and second modes, at least one of the first and second modes being performable for another random length of time,
  wherein the random length of time and the another random length of time are set independently of one another, and
  wherein the program further comprises instructions to at least cooperate with the communication unit in the first mode for receiving responding data from another device in response to the device's own search.

70. The non-transitory computer readable storage medium of claim 68, wherein the program further comprises instructions to at least:
  execute, after receiving a search via the communication unit in the second mode, a first connection process with another device that sent the search; and
  execute, after receiving responding data via the receiving unit, a second connection process with another device that sent the responding data.

71. A non-transitory computer readable storage medium tangibly storing a program executable on a device configured to play a game comprising at least one processor and a communication unit for performing wireless radio communication, the program comprising instructions configured to at least:
  cause the communication unit to operate in a first mode and a second mode, the communication unit in the first mode searching other devices in the second mode, the communication unit in the second mode searching other devices in the first mode; and
  cycle the communication unit so that the communication unit alternately repeats the first and second modes, at least one of the first and second modes being performable for a random length of time.

72. A method for performing wireless radio communication, the method comprising:
  using at least one processor of a game-playing device,
  causing a communication unit to operate in a first mode for searching for another device;
  causing the communication unit to operate in a second mode for receiving a search from another device; and
  cycling the communication unit so that the communication unit alternately repeats the first and second modes, at least one of the first and second modes being performable for a random length of time.

73. A method for performing wireless radio communication, the method comprising:
  using at least one processor of a game-playing device,
  causing a communication unit to operate in a first mode for searching for another device;
  causing the communication unit to operate in a second mode for receiving a search from another device; and
  cycling the communication unit so that the communication unit alternately repeats the first and second modes, at least one of the first and second modes being performable at a random-based time.

74. A device configured to play a game, comprising:
  a communication unit capable of performing wireless radio communication, the communication unit being operable in a first mode for searching for another device, and a second mode for receiving a search from another device; and
  a cycling unit cooperating with the communication unit capable of alternately repeating the first and second modes, at least one of the first and second modes being performable for a random length of time.

75. A device configured to play a game, comprising:
  a communication unit capable of performing wireless radio communication, the communication unit being operable in a first mode for searching for another device, and a second mode for receiving a search from another device; and
  a cycling unit cooperating with the communication unit capable of alternately repeating the first and second modes, at least one of the first and second modes being performable at a random-based time.

76. A game device, comprising:
  a communication unit for performing wireless radio communication, the communication unit being operable in a first mode for searching for another device, and a second mode for receiving a search from another device; and
  a cycling unit cooperating with the communication unit for alternately repeating the first and second modes, at least one of the first and second modes being performable for a random length of time.

77. The game device of claim 76, wherein at least one of the first and second modes is performable for a random length of time that varies periodically.

78. The game device of claim 76, wherein at least one of the first and second modes is performable for a random length of time that varies with a predetermined cycle.

79. The game device of claim 78, wherein at least one of the first and second modes is performable for a random length of time that varies with each repetition of the cycling unit.

80. The game device of claim 76, wherein one of the first and second modes is performed for a fixed length of time and the other of the first and second modes is performed for a random length of time.

81. The game device of claim 78, wherein one of the first and second modes is performed for a fixed length of time and the other of the first and second modes is performed for a random length of time.

82. The game device of claim 81, wherein the second mode is performed for a random length of time.

83. The game device of claim 82, wherein the random length of time varies for each repetition of the second mode.

84. The device of claim 1, further comprising a sending unit cooperating with the communication unit operating in the second mode for sending data, in response to receiving the search, to the another device that sent the search so that the device and the another device connect with each other.

85. The device of claim 35, wherein at least one of the first and second modes is performable for a random length of time that varies periodically.

86. The device of claim 35, wherein at least one of the first and second modes is performable for a random length of time that varies with a predetermined cycle.

87. The device of claim 35, wherein one of the first and second modes is performed for a fixed length of time and the other of the first and second modes is performed for a random length of time.

88. The device of claim 86, wherein one of the first and second modes is performed for a fixed length of time and the other of the first and second modes is performed for a random length of time.

89. The device of claim 88, wherein the second mode is performed for a random length of time.

90. The device of claim 35, wherein the cycling unit cooperates with the communication unit for alternately repeating the first and second modes, at least one of the first and second modes being performable for a length of time that varies across cycles.

91. A device configured to play a game, comprising:
a communication unit for performing wireless radio communication, the communication unit being operable in a first mode and a second mode, the communication unit in the first mode searching other devices in the second mode, the communication unit in the second mode searching other devices in the first mode; and
a cycling unit cooperating with the communication unit for alternately repeating the first and second modes, at least one of the first and second modes being performable at a random-based time.

92. The device of claim 91, wherein at least one of the first and second modes is performable for a random length of time that varies in different cycles.

93. The device of claim 35, wherein the random length of time exceeds a predetermined minimum duration.

94. The device of 35, wherein the random length of time does not exceed a predetermined maximum duration.

95. The device of claim 35, further comprising a responding unit cooperating with the communication unit in the second mode for sending responding data, in response to receiving a search, to another device that sent the search.

96. The device of claim 95, wherein the responding unit sends the responding data automatically.

97. The device of claim 95, further comprising a receiving unit cooperating with the communication unit in the first mode for receiving responding data from another device in response to the device's own search.

98. The non-transitory computer readable storage medium of claim 71, wherein at least one of the first and second modes is performable for a random length of time that varies periodically.

99. The non-transitory computer readable storage medium of claim 71, wherein at least one of the first and second modes is performable for a random length of time that varies with a predetermined cycle.

100. The non-transitory computer readable storage medium of claim 71, wherein one of the first and second modes is performed for a fixed length of time and the other of the first and second modes is performed for a random length of time.

101. The non-transitory computer readable storage medium of claim 99, wherein one of the first and second modes is performed for a fixed length of time and the other of the first and second modes is performed for a random length of time.

102. The non-transitory computer readable storage medium of claim 101, wherein the second mode is performed for a random length of time.

103. A non-transitory computer readable storage medium tangibly storing a program executable on a device configured to play a game comprising at least one processor and a communication unit for performing wireless radio communication, the program comprising instructions configured to at least:
cause the communication unit to operate in a first mode and a second mode, the communication unit in the first mode searching other devices in the second mode, the communication unit in the second mode searching other devices in the first mode; and
cycle the communication unit so that the communication unit alternately repeats the first and second modes, at least one of the first and second modes being performable at a random-based time.

104. The non-transitory computer readable storage medium of claim 103, wherein at least one of the first and second modes is performable for a random length of time that varies in different cycles.

105. The non-transitory computer readable storage medium of claim 71, wherein the random length of time exceeds a predetermined minimum duration.

106. The non-transitory computer readable storage medium of claim 71, wherein the random length of time does not exceed a predetermined maximum duration.

107. The non-transitory computer readable storage medium of claim 71, wherein the program further comprises instructions to at least cooperate with the communication unit in the second mode for sending responding data, in response to receiving a search, to another device that sent the search.

108. The non-transitory computer readable storage medium of claim 107, wherein the responding data is sent automatically.

109. The non-transitory computer readable storage medium of claim 107, wherein the program further comprises instructions to at least cooperate with the communication unit in the first mode for receiving responding data from another device in response to the device's own search.

110. A non-transitory computer readable storage medium tangibly storing instructions for a device configured to play a game comprising at least one processor and a communication unit for performing wireless radio communication, the instructions configured to at least:
cause the communication unit to operate in a first mode for searching for another device;
cause the communication unit to operate in a second mode for receiving a search from another device; and
cycle the communication unit so that the communication unit alternately repeats the first and second modes, at least one of the first and second modes being performable for a random length of time.

111. A non-transitory computer readable storage medium tangibly storing instructions for a device configured to play a game comprising at least one processor and a communication unit for performing wireless radio communication, the instructions configured to at least:
cause the communication unit to operate in a first mode for searching for another device;
cause the communication unit to operate in a second mode for receiving a search from another device; and
cycle the communication unit so that the communication unit alternately repeats the first and second modes, at least one of the first and second modes being performable at a random-based time.

112. A non-transitory computer readable storage medium tangibly storing instructions for a device configured to play a game comprising at least one processor and a communication unit for performing wireless radio communication, the instructions configured to at least:
cause the communication unit to operate in a first mode and a second mode, the communication unit in the first mode searching other devices in the second mode, the communication unit in the second mode searching other devices in the first mode; and
cycle the communication unit so that the communication unit alternately repeats the first and second modes, at least one of the first and second modes being performable for a random length of time.

\* \* \* \* \*